US009919726B2

(12) United States Patent
Labbe et al.

(10) Patent No.: US 9,919,726 B2
(45) Date of Patent: Mar. 20, 2018

(54) ADJUSTABLE HANDLEBAR RISER ASSEMBLY

(71) Applicant: BOMBARDIER RECREATIONAL PRODUCTS INC., Valcourt (CA)

(72) Inventors: Christian Labbe, Sherbrooke (CA); Yvon Bedard, Orford (CA); Mathieu Mercier, Sherbrooke (CA); Alain Lavoie, Drummondville (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 133 days.

(21) Appl. No.: 14/765,239

(22) PCT Filed: Jun. 12, 2013

(86) PCT No.: PCT/US2013/045305
§ 371 (c)(1),
(2) Date: Jul. 31, 2015

(87) PCT Pub. No.: WO2014/120269
PCT Pub. Date: Aug. 7, 2014

(65) Prior Publication Data
US 2015/0360713 A1  Dec. 17, 2015

Related U.S. Application Data

(60) Provisional application No. 61/759,116, filed on Jan. 31, 2013.

(51) Int. Cl.
*B62D 1/185* (2006.01)
*B62K 21/00* (2006.01)
(Continued)

(52) U.S. Cl.
CPC .............. *B62D 1/185* (2013.01); *B62K 11/14* (2013.01); *B62K 21/00* (2013.01); *B62K 21/125* (2013.01);
(Continued)

(58) Field of Classification Search
CPC ........ B62K 21/22; B62K 25/06; B62K 25/08; B62K 19/32; Y10T 74/20816;
(Continued)

(56) References Cited

U.S. PATENT DOCUMENTS 1,925,419 A * 9/1933 Swenson ................... F16D 3/32
403/379.3
2,350,582 A * 6/1944 Booth ................... F16B 7/0413
403/379.3

(Continued)

FOREIGN PATENT DOCUMENTS

DE 20310591 U1 1/2004
EP 0111439 A1 6/1984

OTHER PUBLICATIONS

International Search Report of PCT/US2013/045305; Blaine R. Copenheaver; dated Nov. 14, 2013.

(Continued)

*Primary Examiner* — Daniel D Yabut
(74) *Attorney, Agent, or Firm* — BCF LLP

(57) ABSTRACT

An adjustable handlebar riser assembly has an outer member, an inner member, a pin, a retainer member and a locking member. The inner member and the outer member have mating flat-bottom V-shaped faces. The inner member slides at least in part within the outer member. Each of the outer and inner members has at least one aperture through their flat-bottom V-shaped faces. The pin is inserted in an aperture of the outer member and in an aperture of the inner member. The retaining member is connected to the pin at one end
(Continued)

while the locking member is connected to an opposed end of the pin. The locking member can exert a tension on the pin, pressing the outer member onto the inner member for locking these members at a selected position relative to one another.

20 Claims, 32 Drawing Sheets

(51) Int. Cl.
  *B62K 11/14* (2006.01)
  *B62K 21/22* (2006.01)
  *B62K 21/12* (2006.01)
  *B62M 27/02* (2006.01)
(52) U.S. Cl.
  CPC ....... *B62K 21/22* (2013.01); *B62M 2027/026* (2013.01); *Y10T 74/20792* (2015.01)
(58) Field of Classification Search
  CPC ........... Y10T 74/2081; Y10T 74/20792; Y10T 74/20798; Y10T 74/20786; Y10T 403/32501; Y10T 403/32508; Y10T 403/32483; Y10T 403/32475; Y10T 403/32467; Y10T 403/7079; Y10T 403/7084; Y10T 403/7086; Y10T 403/7088; Y10T 403/7091; Y10T 403/32286; Y10T 403/3961; Y10T 403/4677; Y10T 403/4674; Y10T 403/7071; Y10T 403/598; Y10T 403/595; Y10T 403/604; F16B 7/105; F16B 7/14; F16B 7/1418; F16B 7/1427; F16B 7/1445; F16B 7/1454; F16B 7/1463; F16B 2007/16
  See application file for complete search history.

(56) References Cited

U.S. PATENT DOCUMENTS

| | | | | |
|---|---|---|---|---|
| 4,688,817 | A | * | 8/1987 | Marier ................... B62B 13/10 180/182 |
| 6,776,429 | B2 | * | 8/2004 | Chou ..................... B62K 21/18 280/279 |
| 6,929,278 | B2 | * | 8/2005 | Vaisanen ................ B62K 21/22 180/190 |
| 2002/0139217 | A1 | * | 10/2002 | Montague ............ B62K 15/006 74/493 |
| 2003/0035682 | A1 | * | 2/2003 | Chen ..................... B62K 15/006 403/109.7 |
| 2003/0214112 | A1 | * | 11/2003 | Chou ..................... B62K 21/18 280/278 |
| 2004/0239072 | A1 | * | 12/2004 | Chou ..................... B62K 21/16 280/287 |
| 2007/0068331 | A1 | | 3/2007 | Cutsforth |
| 2008/0202280 | A1 | * | 8/2008 | Olson .................... B62K 21/16 74/551.3 |
| 2009/0057505 | A1 | * | 3/2009 | Chen ..................... B62K 15/006 248/185.1 |
| 2013/0175106 | A1 | * | 7/2013 | Bedard .................. B62M 27/02 180/190 |

OTHER PUBLICATIONS

English abstract of DE20310591U1; Retrieved from http://worldwide.espacenet.com/publicationDetails/biblio?CC=DE&NR=20310591U1&KC=U1&FT=D&ND=3&date=20031204&DB=worldwide.espacenet.com&locale=en_EP dated Jul. 27, 2015.
English abstract of EP0111439A1; Received from the International Searching Authority dated Nov. 14, 2013.

* cited by examiner

ADJUSTABLE HANDLEBAR RISER ASSEMBLY

CROSS-REFERENCE

The present application claims priority to U.S. Provisional Patent Application No. 61/759,116 filed on Jan. 31, 2013, the entirety of which is incorporated herein by reference.

TECHNICAL FIELD

The present invention relates to adjustable handlebar riser assemblies for vehicles.

BACKGROUND

Vehicles, such as, for example, snowmobiles and all terrain vehicles use a handlebar to provide steering control. The handlebar is typically attached to a steering column through a clamp. The clamp used in these steering columns allows the vehicle user to adjust the rotational position of the handlebar with respect to the steering column, but does not allow for other adjustments to be made to the position of the handlebar. The rotational position of the handlebar affects the comfort of the vehicle user's arms, wrists, and hands, but has little effect on the reach, which defines the distance separating the seated user from the handlebar. If a vehicle user desires to adjust the reach, the vehicle user may replace the handlebar with a different model where the hand positions are further or closer to the vehicle user. Since this option is not economically feasible for every rider, many riders are forced into a riding position that may not be comfortable. Also, the option of replacing a handlebar to suit the needs of a particular user is not convenient in the case of a vehicle driven by more than one person.

A handlebar riser may be inserted between the steering column and the handlebar in order to move the handlebar position within a better reach of the vehicle user. Not only can a handlebar riser move the handlebar closer to the rider, it also provides a pivot point for pivoting the handlebar forward, giving the steering column a greater angle with vertical without placing the handlebar too far toward the rear. FIG. 1A to 1D provide various views of a conventional handlebar riser. FIGS. 1A to 1D show a handlebar riser 100 having four sides 102, 104, 106 and 108, a top face 110 and a bottom face 111. The top face has two recesses 112, 114 for installation of a central tubular part of a handlebar (not shown), and four threaded vertical holes 116, 118, 120 and 122 for receiving fasteners, for example bolts, for attachment of clamps or caps (not shown) that maintain the handlebar in position on the handlebar riser 100. The bottom face also has recesses and threaded vertical holes for mounting of the handlebar riser 100, using clamps or caps, on a horizontal shaft (not shown) fixedly mounted to the steering column. A height 124 of the handlebar riser 100 is fixed. Various models may differ in height and the vehicle user may select a particular handlebar riser having a height that provides a desired reach.

The handlebar riser 100 may solve at least in part the problem of reach desired by the vehicle user. However, several problems related to reach of the handlebar remain. A particular vehicle, whether a snowmobile, an all-terrain vehicle, and the like, may be operated by various persons, for instance by several family members of various sizes or when the vehicle is leased on a short-term basis to various customers. Also, when the vehicle is ridden for an extended period, for example for a few hours at a time, the user may desire to vary his/her position by adjusting the reach of the handlebar. These needs cannot be met with a fixed height handlebar riser.

A need, therefore, has developed for a handlebar riser that allows adjustments to be made to the position of the handlebar with respect to the rider without requiring the replacement of the handlebar or of the riser.

SUMMARY

It is an object of the present invention to ameliorate at least some of the inconveniences present in the prior art.

The present introduces a handlebar riser assembly to ameliorate at least some of the inconveniences present in conventional handlebar risers.

In one aspect, the present provides an adjustable handlebar riser assembly comprising an outer member and an inner member slidably disposed at least in part within the outer member. The outer member has opposite sides, each of the opposite sides having on its internal face a flat-bottomed V-shaped protrusion. The inner member has opposite sides having on their external faces flat-bottomed V-shaped recesses adapted for mating with the flat-bottomed V-shaped protrusions of the outer member. Each of the outer and inner members has at least one aperture. A pin having an axis normal to the opposite sides of the outer member is inserted in one of the at least one aperture of the outer member and in one of the at least one aperture of the inner member. A retaining member is connected to the pin and a locking member is operatively connected to the pin at an opposed end from the retaining member. The locking member is configured for releaseably exerting a tension on the pin, the locking member and the retaining member pressing the outer member onto the inner member for locking the outer member at a selected position relative to the inner member.

In a further aspect, the outer member has four sides and a hollow interior allowing at least partial insertion of the inner member therein. The inner member also has four sides and is internally reinforced for resisting the tension exerted on the pin.

In an additional aspect, the inner member comprises two internal reinforcement walls extending on either sides of the pin.

In a further aspect, the at least one aperture of one of the outer and inner members is diametrically opposed apertures for insertion of the pin while the at least one aperture of an other of the outer and inner members is diametrically opposed slots for slideable insertion of the pin. The tension exerted on the pin causes a deformation of the outer member for pressing the outer member onto the inner member.

In another aspect, the deformation of the outer member causes closure of a gap between angled faces of the flat-bottomed V-shaped protrusions of the outer member and angled faces of the flat-bottomed V-shaped recesses of the inner member.

In a further aspect, the locking member comprises a cam lever adapted to release the tension on the pin when in an unlocked position and to exert the tension on the pin when in a locked position.

In another aspect, the cam lever is rotatable between the unlocked position and the locked position.

In another aspect, the adjustable handlebar riser assembly further comprises a cylindrical nut held by the cam lever and fastened to the pin. Moving the cam lever in the locked position pulls on the cylindrical nut to exert the tension on the pin.

In a further aspect, pressing the outer member onto the inner member comprises pressing an internal face of the outer member onto an external face of the inner member.

In another aspect, the at least one aperture of one of the inner and outer members comprises a slot.

In a further aspect, the outer member has a mating end for attachment to one of a handlebar and a steering column shaft. The inner member has a mating end for attachment to an other of the handlebar and the steering column shaft.

In another aspect, the outer member comprises an upper surface having recesses adapted for receiving the handlebar and having holes for receiving fasteners for attaching the handlebar to the outer member. The inner member comprises a lower surface having recesses adapted for mounting on the steering column shaft and having holes for receiving fasteners for attaching the inner member to the steering column shaft.

In a further aspect, the mating end of the outer member and the mating end of the inner member define substantially equal clamping positions for attachment to the handlebar and to the steering column shaft.

In another aspect, the mating end of the outer member and the mating end of the inner member have substantially equal widths while an insertable depth of the inner member is smaller than an interior depth of the outer member.

In a further aspect, the adjustable handlebar riser assembly further comprises a spacer disposed between the locking member and an external face of the outer member, the spacer having an aperture, the pin being inserted in the aperture of the spacer, the locking member pressing on the spacer for further pressing the outer member onto the inner member.

In another aspect, the spacer has angled faces contacting angled external faces of the outer member.

In a further aspect, contact between the angled faces of the spacer and the angled external faces of the outer member prevents relative rotation between the inner member and the outer member about the axis of the pin.

In another aspect, pressing of the locking member on the spacer generates first forces transmitted between the angled faces of the spacer and the angled external faces of the outer member and further generates second forces parallel to the first forces, the second forces being transmitted between angled faces of the flat-bottomed V-shaped protrusions of the outer member and angled faces of the flat-bottomed V-shaped recesses of the inner member.

In a further aspect, the second forces maintain a level of insertion of the inner member into the outer member and prevent the relative rotation between the inner member and the outer member about the axis of the pin.

In another aspect, a first contact area between the angled faces of the spacer and the angled external faces of the outer member is less than a second contact area between the flat-bottomed V-shaped recesses of the inner member and the flat-bottomed V-shaped protrusions of the outer member.

Embodiments of the present invention each have at least one of the above-mentioned aspects, but do not necessarily have all of them. It should be understood that some aspects of the present invention that have resulted from attempting to overcome some of the deficiencies of conventional handlebar risers and of conventional adjustable steering columns may not overcome all of these deficiencies and may overcome other deficiencies not specifically recited herein.

Additional and/or alternative features, aspects, and advantages of embodiments of the present invention will become apparent from the following description, the accompanying drawings, and the appended claims.

BRIEF DESCRIPTION OF THE DRAWINGS

For a better understanding of the present invention, as well as other aspects and further features thereof, reference is made to the following description which is to be used in conjunction with the accompanying drawings, where.

DETAILED DESCRIPTION

The present adjustable handlebar riser assembly will be described with respect to a snowmobile. However, it is contemplated that the adjustable handlebar riser assembly could be used for adjusting the height and reach of handlebars and similar steering controls for other vehicles, such as, but not limited to, a motorcycle, a scooter, a three-wheel road vehicle and an all-terrain vehicle (ATV).

Figure 1A:
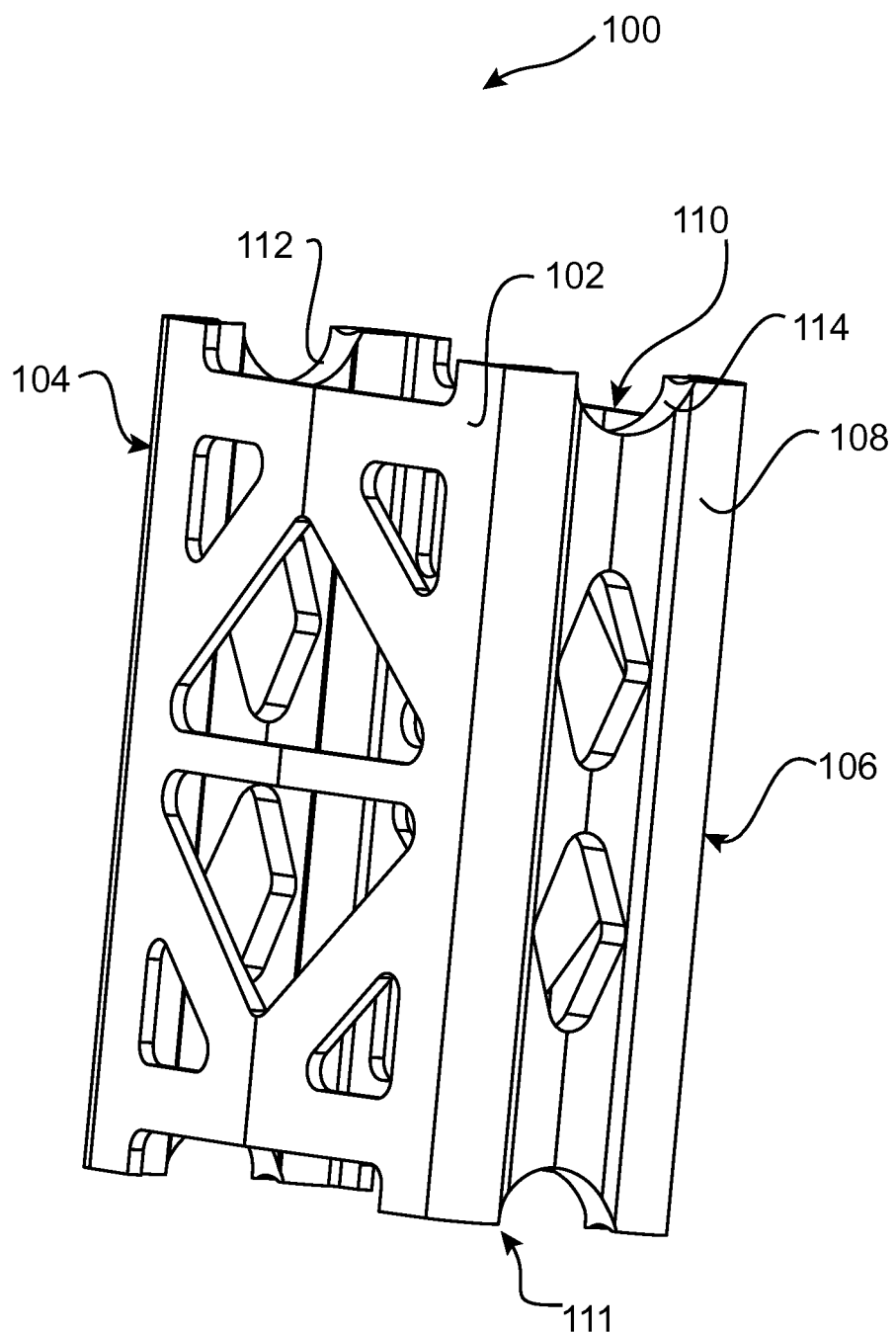
FIG. 1A is a perspective view, taken from a front, left side, of a prior art handlebar riser.
Figure 1B:
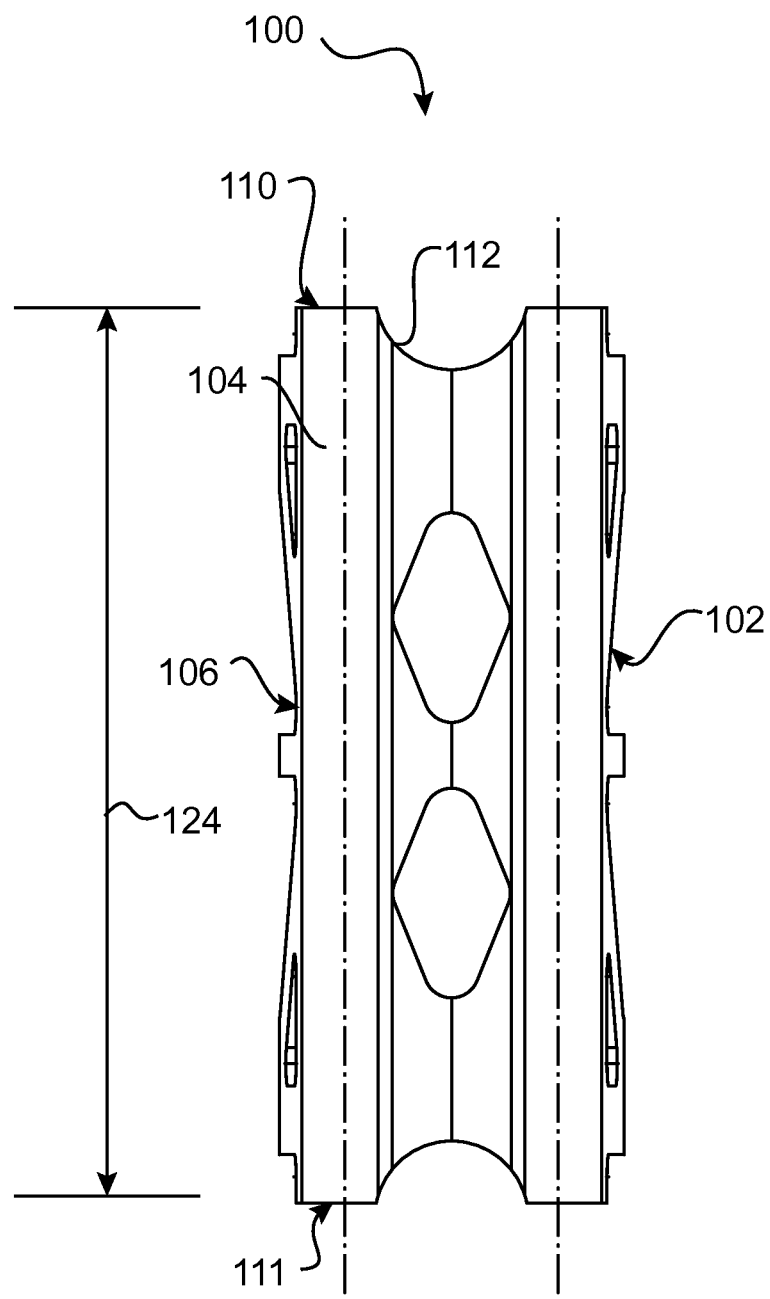
FIG. 1B is a right side elevation view of the handlebar riser of FIG. 1A.
Figure 1C:
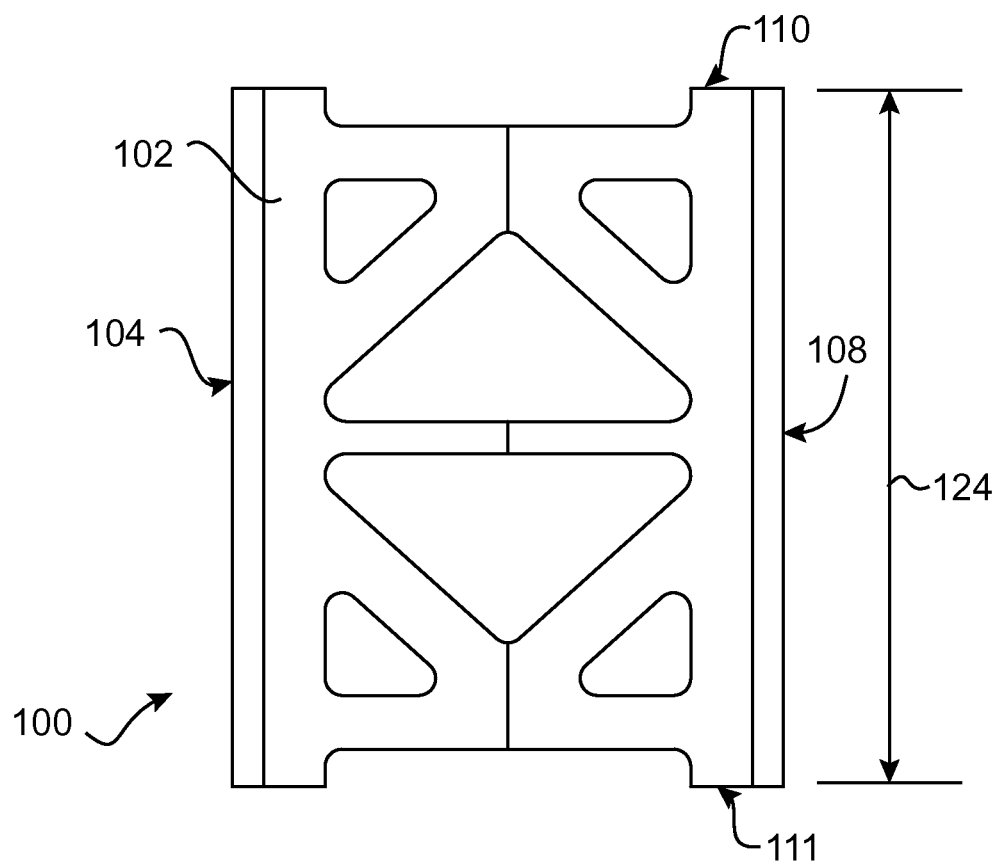
FIG. 1C is a front elevation view of the handlebar riser of FIG. 1A.
Figure 1D:
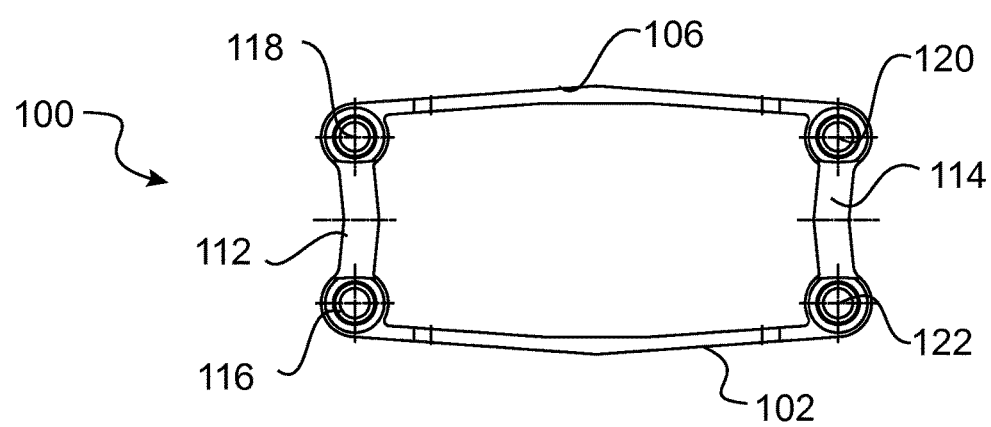
FIG. 1D is a top plan view of the handlebar riser of FIG. 1A.
Figure 2:
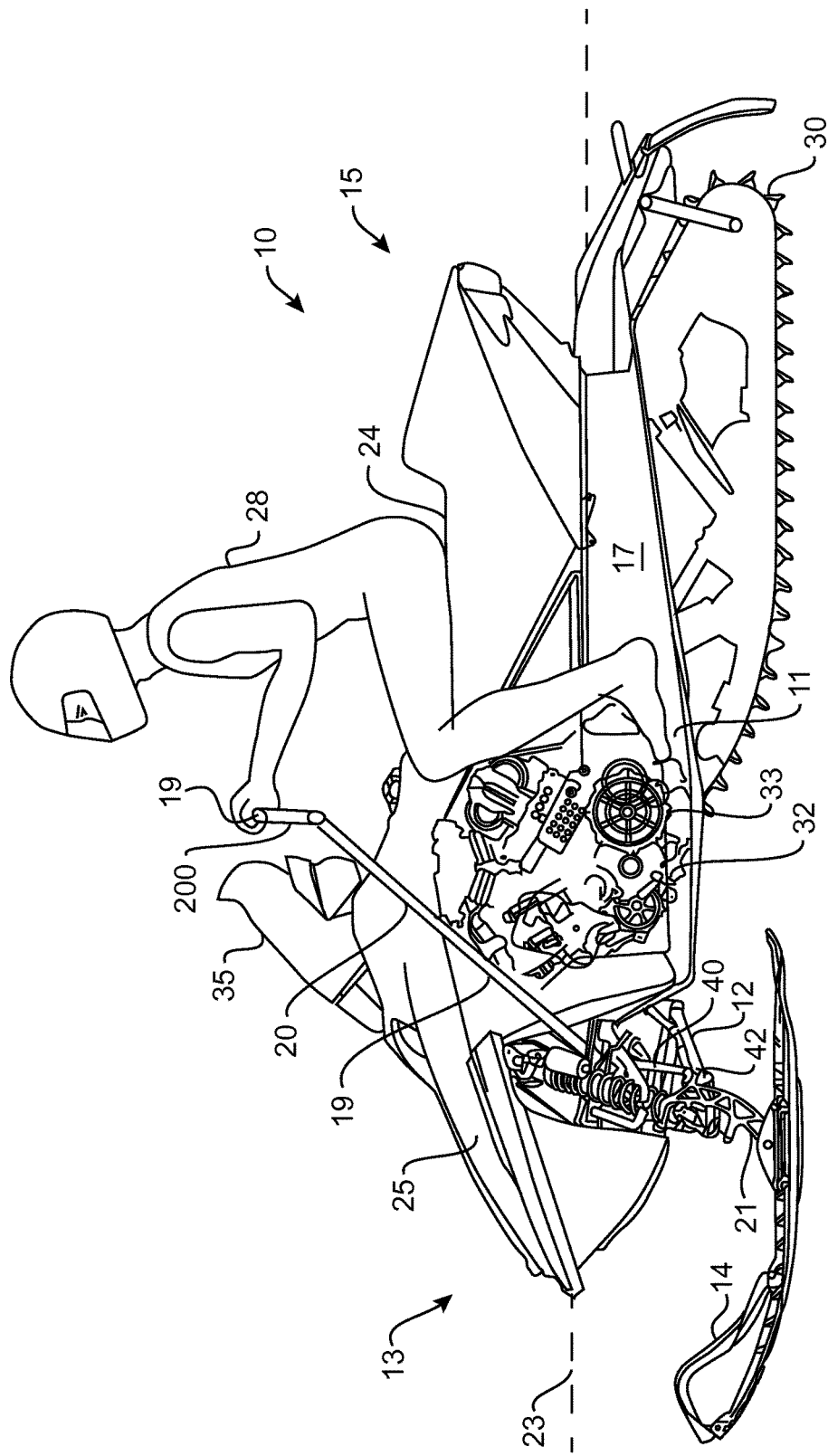
FIG. 2 is a left side elevation view of a snowmobile with portions shown in transparency to reveal components disposed inside the snowmobile.

Referring now to the Figures, FIG. 2 shows a snowmobile having installed thereon an adjustable handlebar riser assembly 200. The snowmobile 10 has a forward end 13 and a rearward end 15, defined consistently with a forward travel direction of the vehicle. The snowmobile 10 includes a frame 11 to which the various snowmobile components are assembled. The frame 11 has a tunnel 17 generally consisting of sheet metal bent in an inverted U-shape and extending rearwardly along a longitudinal axis 23 of the snowmobile 10. The snowmobile 10 has a front suspension system 12 located at a forward portion of the frame 11. The front suspension system 12 supports the forward portion of the snowmobile 10 on the ground and provides steering control for the snowmobile 10. The front suspension system 12 includes two skis 14 and two ski legs 21, though it could be contemplated that a snowmobile could have a single ski. A steering column 20 couples a steering device, in the form of a handlebar 18 positioned forward of a rider 28, to the skis 14. The steering column 20 comprises a steering column shaft assembly 19, and the adjustable handlebar riser assembly 200 through which the handlebar 18 is secured to the steering column shaft assembly 19. The adjustable handlebar riser assembly 200 will be described in greater details below. The steering column 20 transmits the movement of the handlebar 18 to the ski legs 21 and to the skis 14 through tie rods 40 and tie rod ends 42, or alternatively through another mechanical linkage or via an electro-mechanical system. By turning the handlebar 18, the skis 14 are pivoted to steer the snowmobile 10. A propulsion system comprises an endless track 30 positioned at the rearward end 15 of the snowmobile 10 and generally disposed under the tunnel 17. The endless track 30 rotates to propel the snowmobile 10 through snow. An internal combustion engine 32, located at the forward portion of the frame 11 under fairings 25 (shown in part in transparency to reveal the engine 32 and other components of the snowmobile 10), is operatively arranged to drive the endless track 30 through a continuously variable transmission (CVT) 33. It is contemplated that the engine 32 could be replaced by an electric motor or by a combination of an internal combustion engine and an electric motor. It is also contemplated that the CVT 33 could be replaced by another type of transmission system. A straddle-type cushioned seat 24 is provided above the tunnel 17. A snowmobile operator sits on the seat 24 during the operation of the snowmobile 10. A windshield 35 is connected to the fairings 25 near the forward end 13 of the snowmobile 10.

The adjustable handlebar riser assembly 200 will now be described in more details in the following description of FIGS. 3 to 10. The adjustable handlebar riser assembly 200 comprises a plurality of elements, some of which may or may not be present in various embodiments. The adjustable handlebar riser assembly 200 comprises an outer member 202, an inner member 204, a pin 206 having a head 208, a cam lever 210, a cylindrical nut 212, a lock washer 216 and a spacer 330.

The inner member 204 has four sides including a back side 230, a left side 232, a front side 234 and a right side 236, and a mating end 238 for attachment to a steering column 20. The mating end 238 has two opposed recesses 239, 240 for mounting on a horizontal shaft 44 fixedly mounted to a steering column shaft assembly 19. The mating end 238 also has four holes 241, 242, 244 and 246 for receiving fasteners, for example bolts, for attachment of clamps or caps 46 that maintain the adjustable handlebar riser assembly 200 in position on the horizontal shaft 44. A center-to-center distance 248 is defined between the holes 241 and 242. The same distance 248 is defined between holes 244 and 246. In a perpendicular direction, a center-to-center distance 250 is defined between the holes 241 and 246. The same distance 250 is defined between the holes 242 and 244. The vertical holes 241, 242, 244 and 246 have internal threads for receiving bolts. Other constructions of the inner member 204 may have a differently shaped mating end 238 with through holes for mounting to a steering column using nuts and bolts.

Diametrically opposed slots 222 are present on the back and front sides 230 and 234, which are opposite sides extending normal to an axis of the pin 206. Within a perimeter defined by the four sides 230, 232, 234, 236 are defined two reinforcement walls 254 and 256. The reinforcement walls 254 and 256 are perpendicular to a plane containing one of the slots 222 and parallel to the axis of the pin 206. The reinforcement walls 254 and 256 internally reinforce the inner member 204 and prevent, or limit, deformation of the inner member 204 when a tension is applied on the pin 206. Other orientations for the reinforcement walls 254 and 256 are contemplated such as honeycomb shaped or angled reinforcement walls. The back and front sides 230 and 234 have flat-bottomed V-shaped recesses extending on their external faces along a height of the back and front sides 230 and 234. The flat-bottomed V-shaped recesses comprise middle faces 258 and 260 and, on each side thereof, angled faces 262, 264, 266 and 268. The slots 222 extend along the middle flat faces 258 and 260. It is contemplated that the middle faces 258, 260, and the angled faces 262, 264, 266 and 268 could be smooth, or could be textured or knurled for increasing friction when/if mating with the outer member 202.

The inner member 204 is wider at the mating end 238. The back and front sides 230 and 234 taper towards the top of the inner member 204. The left and right sides 232 and 236 are shorter than the back and front sides 230 and 234, thus not reaching the top of the inner member 204. Edges of the angled flat faces 262, 264, 266 and 268 define an insertable depth 270 of the inner member 204. An insertable width 272 of the inner member 204 is defined in part by its shape and in part by an internal width and shape of the outer member 202. In the context of the present disclosure, a width is a dimension taken parallel to the handlebar 18 and a depth is taken normal to the width. Considering FIG. 3, this shape of the inner member 204, combined with a shape of the outer member 202, enables a deep insertion of the inner member 204 within the outer member 202 in spite of a broad perimeter defined by the mating end 238. In other embodiments, the inner member 204 could have a constant cross-section, from bottom to top.

With reference to FIGS. 5A-5D, the outer member 202 has a mating end 274 for attachment to the handlebar 18. The mating end 274 has two opposed recesses 275, 276 for receiving the handlebar 18. The mating end 274 also has four holes 277, 278, 280 and 282 for receiving fasteners, for example bolts, for attachment of clamps or caps 50 that maintain the handlebar 18 in position on the adjustable handlebar riser assembly 200. As illustrated, the holes 277 and 278 and the holes 280 and 282 have the same center-to-center distance 248 defined on the outer member 202. A center-to-center 251 distance between the holes 277 and 282 and between the holes 278 and 280 is the same as the distance 250 defined on the outer member 202. It is contemplated that the distances 250 and 251 could be different as well. The holes 277, 278, 280 and 282 have internal threads for receiving bolts. Other constructions of the outer member 202 may have a differently shaped mating end 274 with through-holes for mounting of a handlebar 18 using nuts and bolts.

Figure 3:
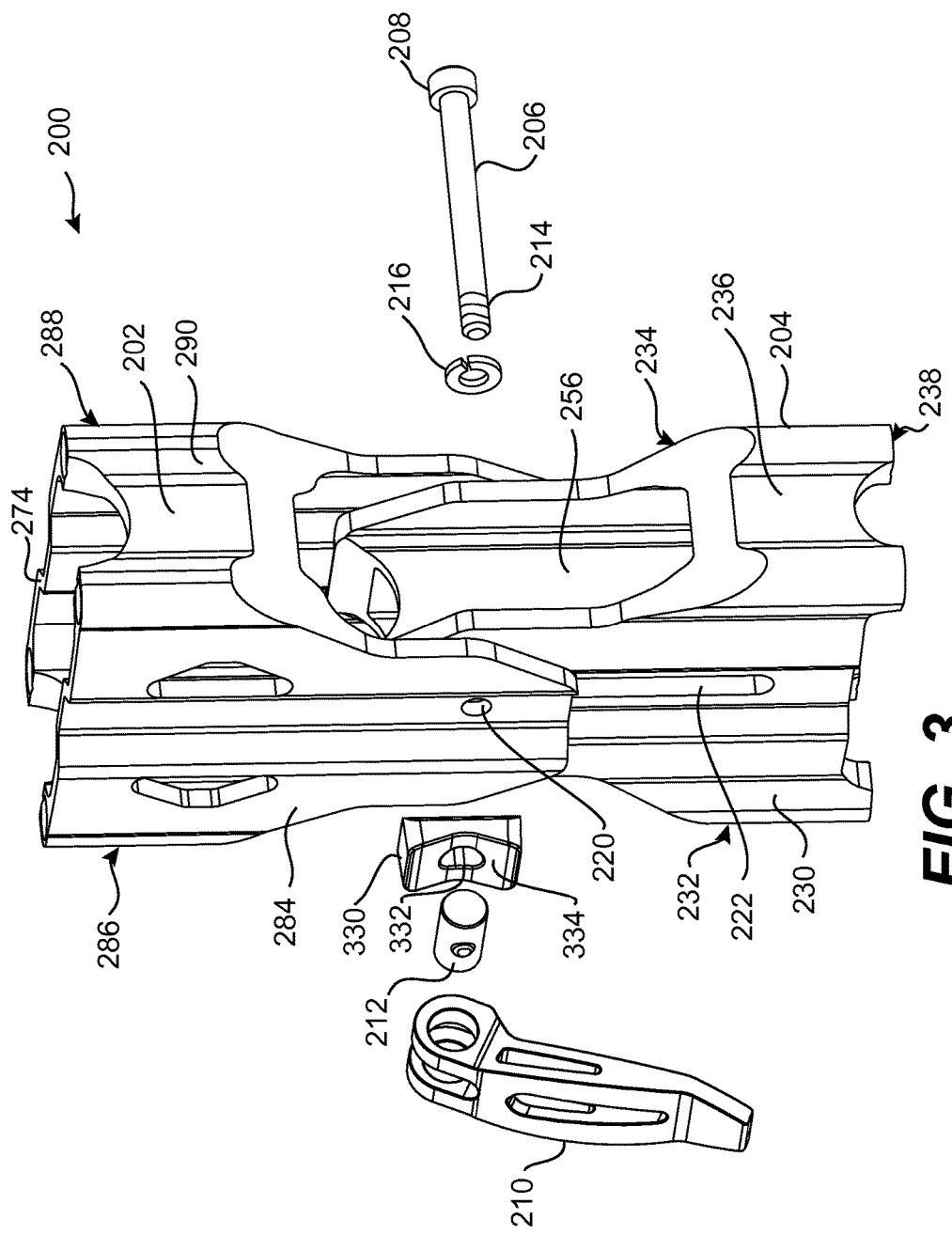
FIG. 3 is an exploded, perspective view, taken from a back, right side, of an adjustable handlebar riser assembly.
Figure 4A:
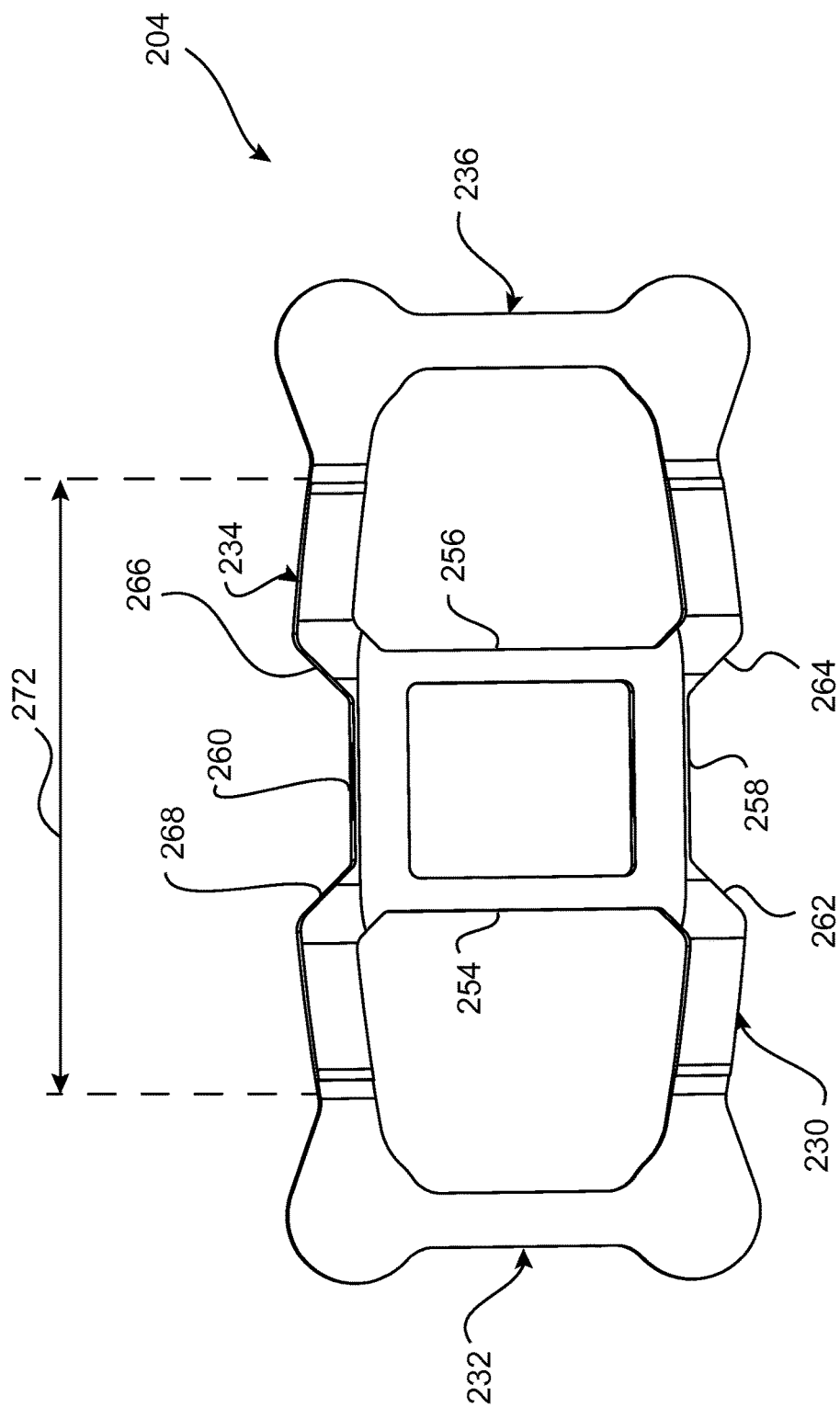
FIG. 4A is a top plan view of an inner member of the adjustable handlebar riser assembly of FIG. 3.
Figure 4B:
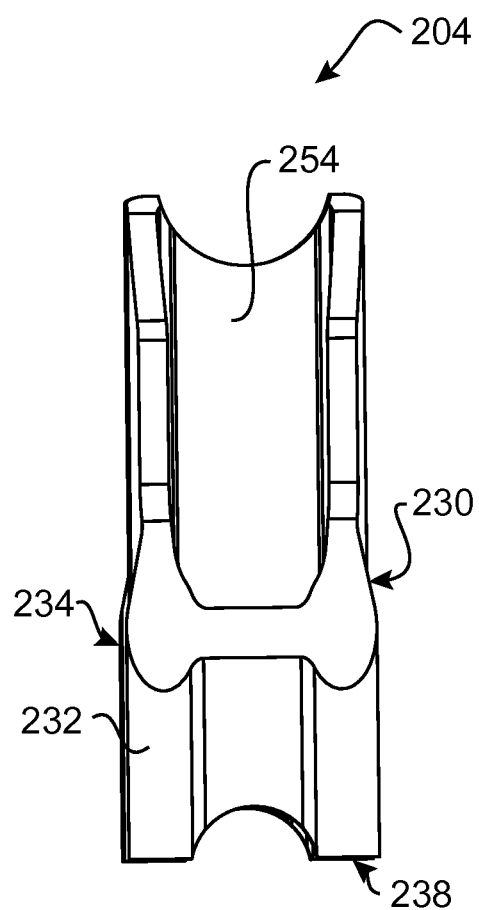
FIG. 4B is a left side elevation view of the inner member of FIG. 4A.
Figure 4C:
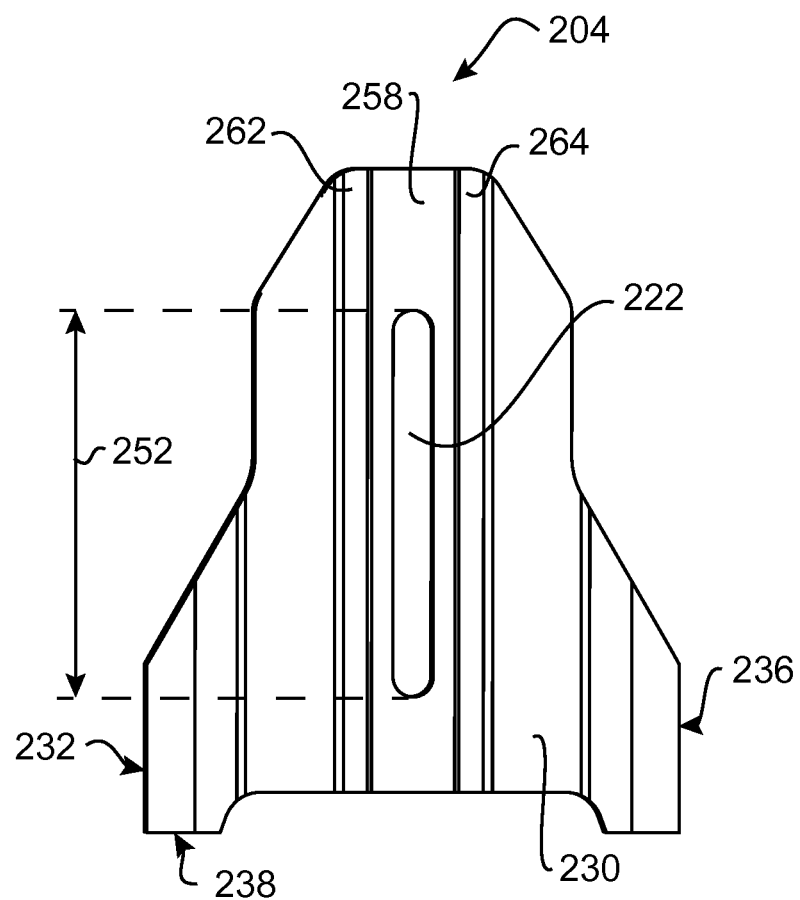
FIG. 4C is a back elevation view of the inner member of FIG. 4A.
Figure 4D:
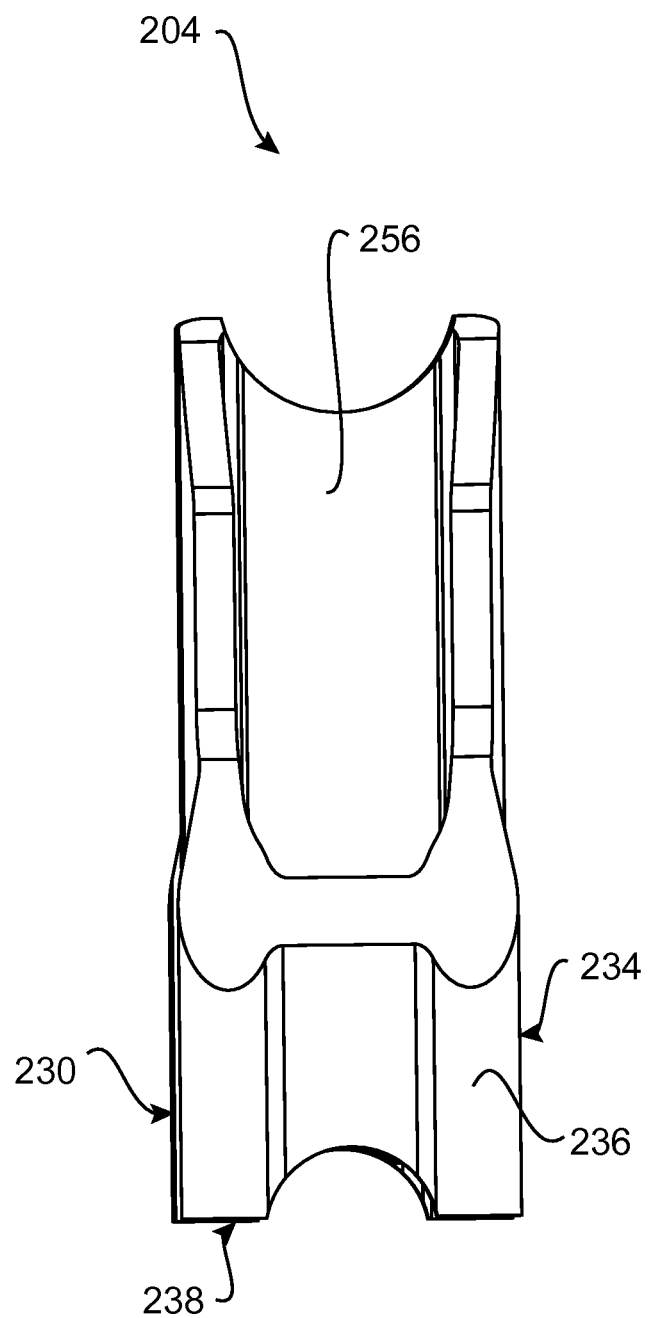
FIG. 4D is a right side elevation view of the inner member of FIG. 4A.
Figure 4E:
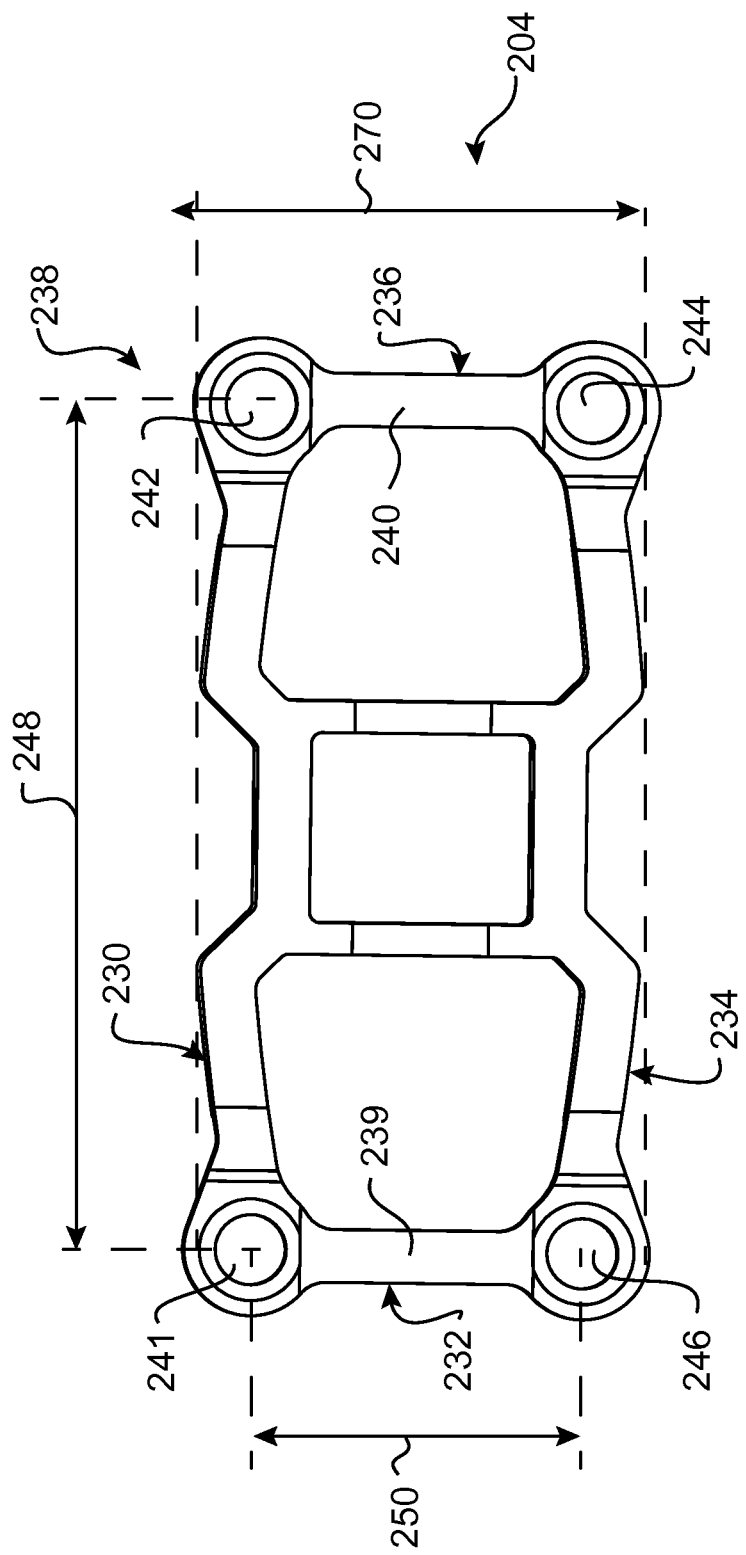
FIG. 4E is a bottom plan view of the inner member of FIG. 4A.
Figure 4F:
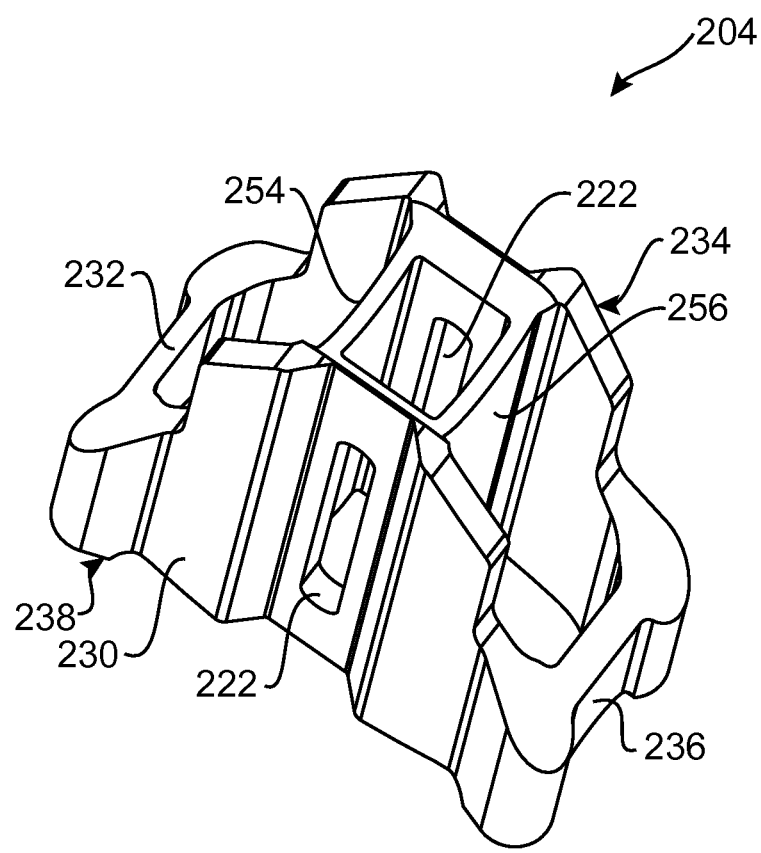
FIG. 4F is perspective view, taken from a back, right side, of the inner member of FIG. 4A.
Figure 6A:
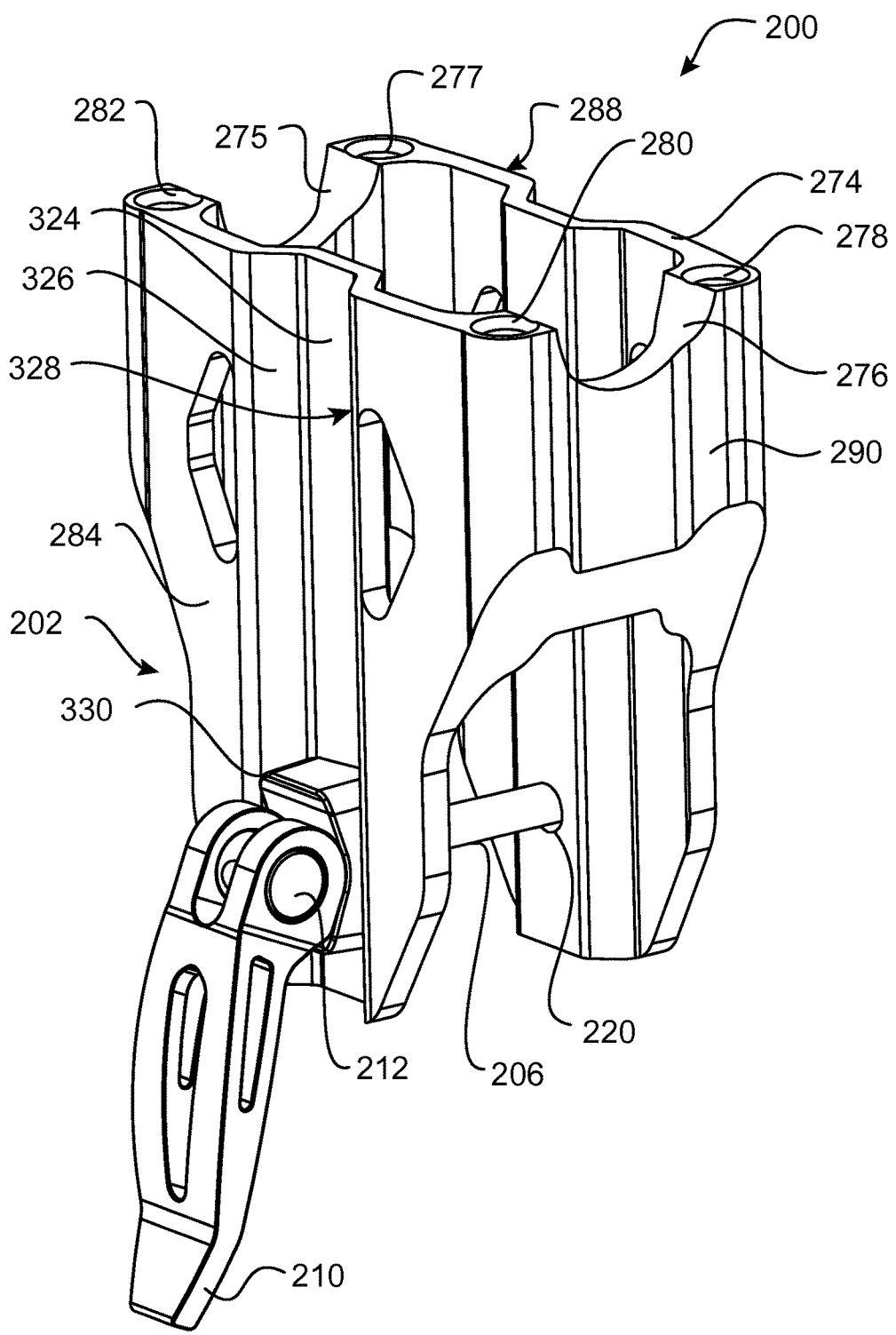
FIGS. 6A and 6B are perspective views, taken from the back, right side, of the outer member of the adjustable handlebar riser assembly of FIG. 3, with a locking member in a locked position and in an unlocked position, respectively.
Figure 6B:
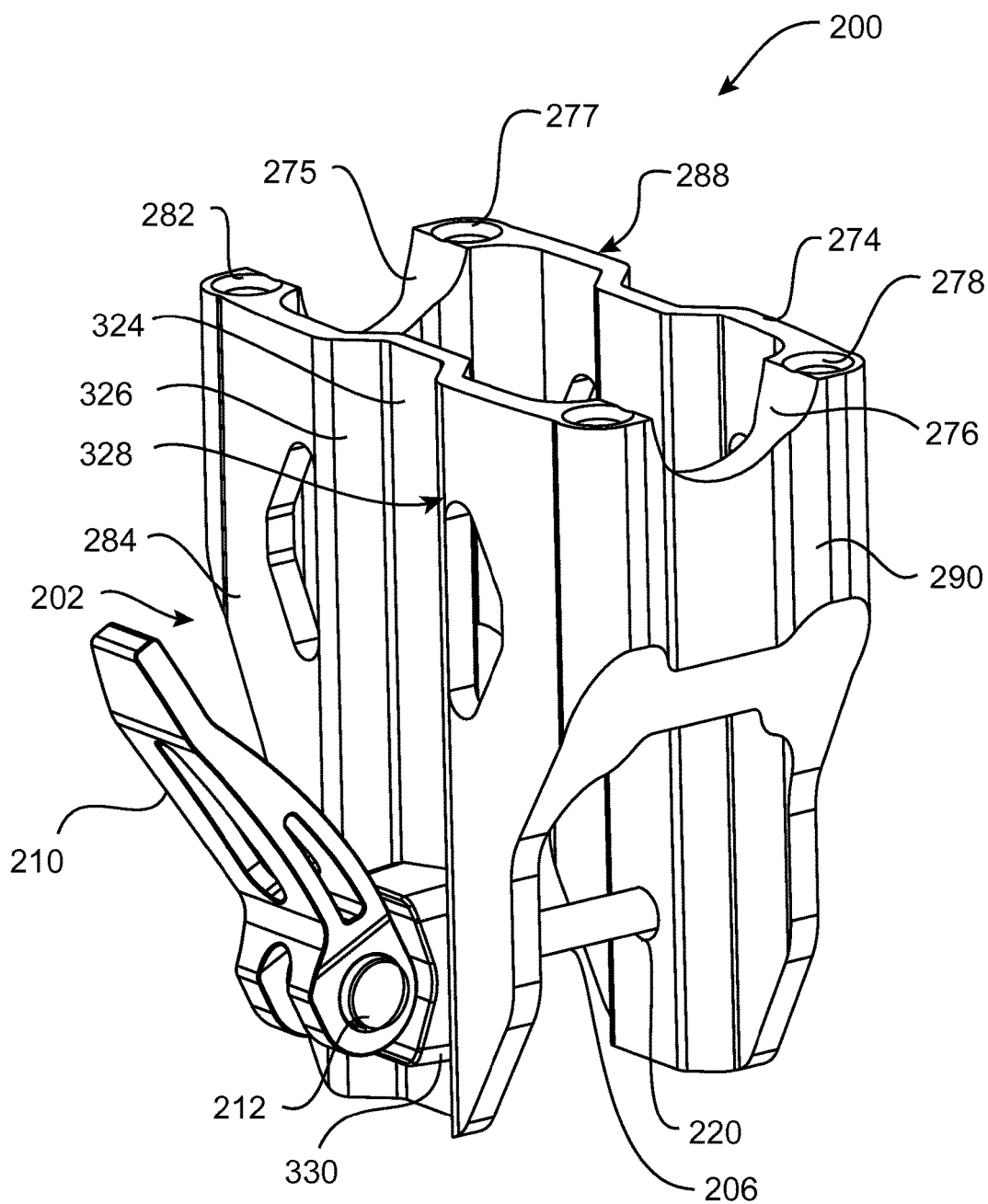

The outer member 202 has four sides, including a back side 284, a left side 286, a front side 288 and a right side 290, collectively defining a hollow interior. The back and front sides 284 and 288 are opposite sides extending perpendicularly from an axis of the pin 206. Diametrically opposed apertures 220 are present on the back and front sides 284 and 288. The back and front sides 284 and 288 also have flat-bottomed V-shaped protrusions extending on their interior faces along a height of the back and front sides 284 and 288. The flat-bottomed V-shaped protrusions comprise middle faces 292 and 294 and, on each side thereof, angled faces 296, 298, 300 and 302. The flat-bottom V-shaped protrusions on the interior faces of the outer member 202 correspond to flat-bottom V-shaped recesses on the external faces of the outer member 202. The flat-bottom V-shaped recess on the back side 284 comprises a middle external face 324 and, on each side thereof, angled external faces 326 and 328. The front side 288 is comparatively shaped. The apertures 220 shown on FIGS. 3, 6A and 6B are located in the middle faces 292 and 294, near an end thereof opposite from the mating end 274. It is contemplated that the middle faces 292, 294, and the angled faces 296, 298, 300 and 302 could be smooth, or could be textured or knurled for increasing the friction when/if mating with the inner member 204.

The outer member 202 is wider at the mating end 274. The back and front sides 284 and 288 taper towards the bottom of the outer member 202. The left and right sides 286 and 290 are shorter than the back and front sides 284 and 288, thus not reaching the bottom of the outer member 202. This tapering of the outer member 202 towards its bottom enables a deep insertion of the inner member 204 within the outer member 202. In other embodiments, the outer member 202 could have a constant cross-section, from bottom to top.

The outer member 202 has an interior width 304 sized to accommodate the insertable width 272 of the inner member 204. The outer member 202 also has an interior depth 306, defined by edges of the angled faces 296, 298, 300 and 302, and sized to accommodate the insertable depth 270 of the inner member 204. The interior faces of the back and front sides 284 and 288 are shaped to mate with the external faces of the back and front sides 230 and 234 of the inner member 204, when inserted within the outer member 202. This mating of the flat-bottomed V-shaped recesses of the inner member 204 with the flat-bottomed V-shaped protrusions of the outer member 202 provide increased contact areas between the inner member 204 and the outer member 202. Mating of the flat-bottomed V-shaped recesses and protrusions also helps maintaining proper vertical alignment between the outer member 202 and the inner member 204, preventing sideways motion between these members and thus limiting rocking movement of the handlebar 18 when in a locked position.

The inner member 204 is slidably disposed in part within the outer member 202. The pin 206 is inserted through circular apertures 220 of the outer member 202, through slots 222 of the inner member 204, and through a circular aperture 332 of the spacer 330. The spacer 330 is disposed generally between the back side 284 of the outer member 202 and the cam lever 210. The slots 222 allow sliding up or down of the pin 206 along a height 252 of the slots 222. The cam lever 210 and the cylindrical nut 212 are operably connected to the pin 206 at an opposed end from the head 208. The cylindrical nut 212 is held in place by the cam lever 210 and is screwably connected to the pin 206, at a threaded end 214 of the pin 206.

Figure 5A:
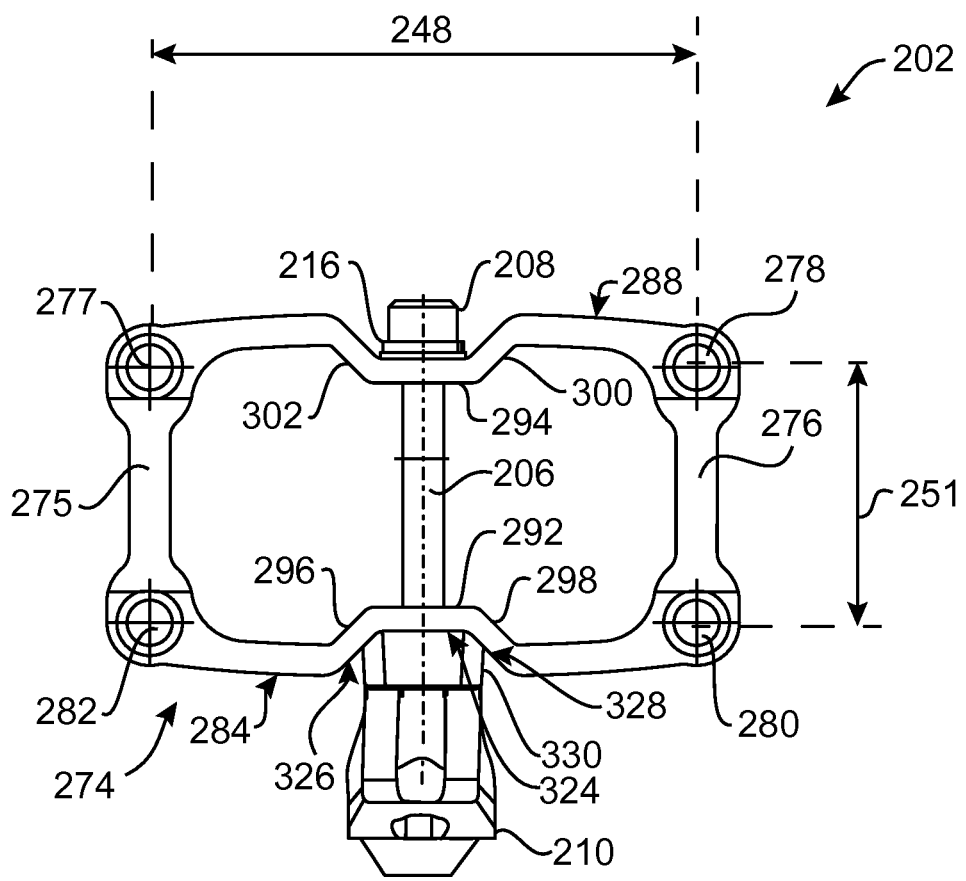
FIG. 5A is a top plan view of an outer member of the adjustable handlebar riser assembly of FIG. 3.
Figure 5B:
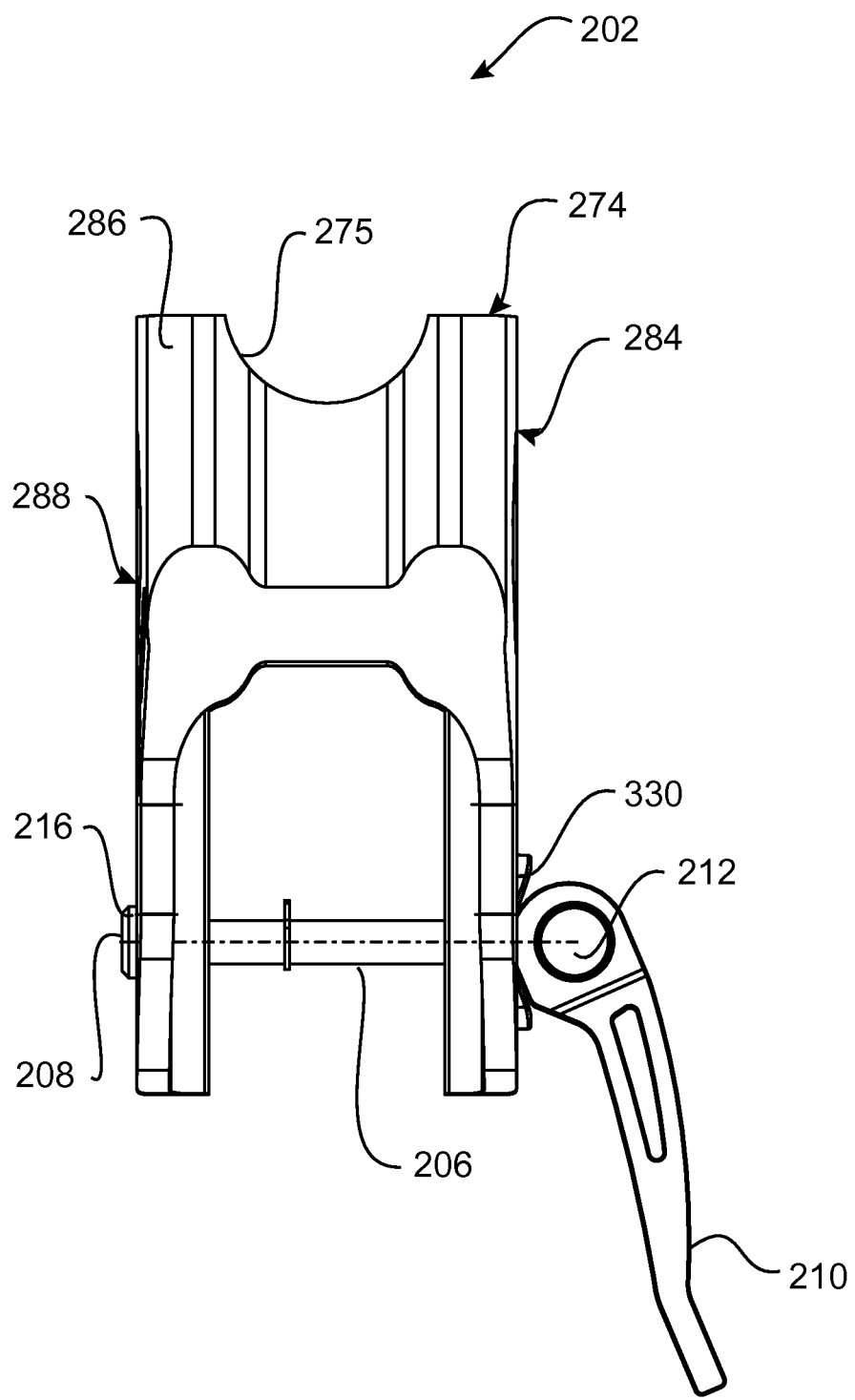
FIG. 5B is a left side elevation view of the outer member of FIG. 5A.
Figure 5C:
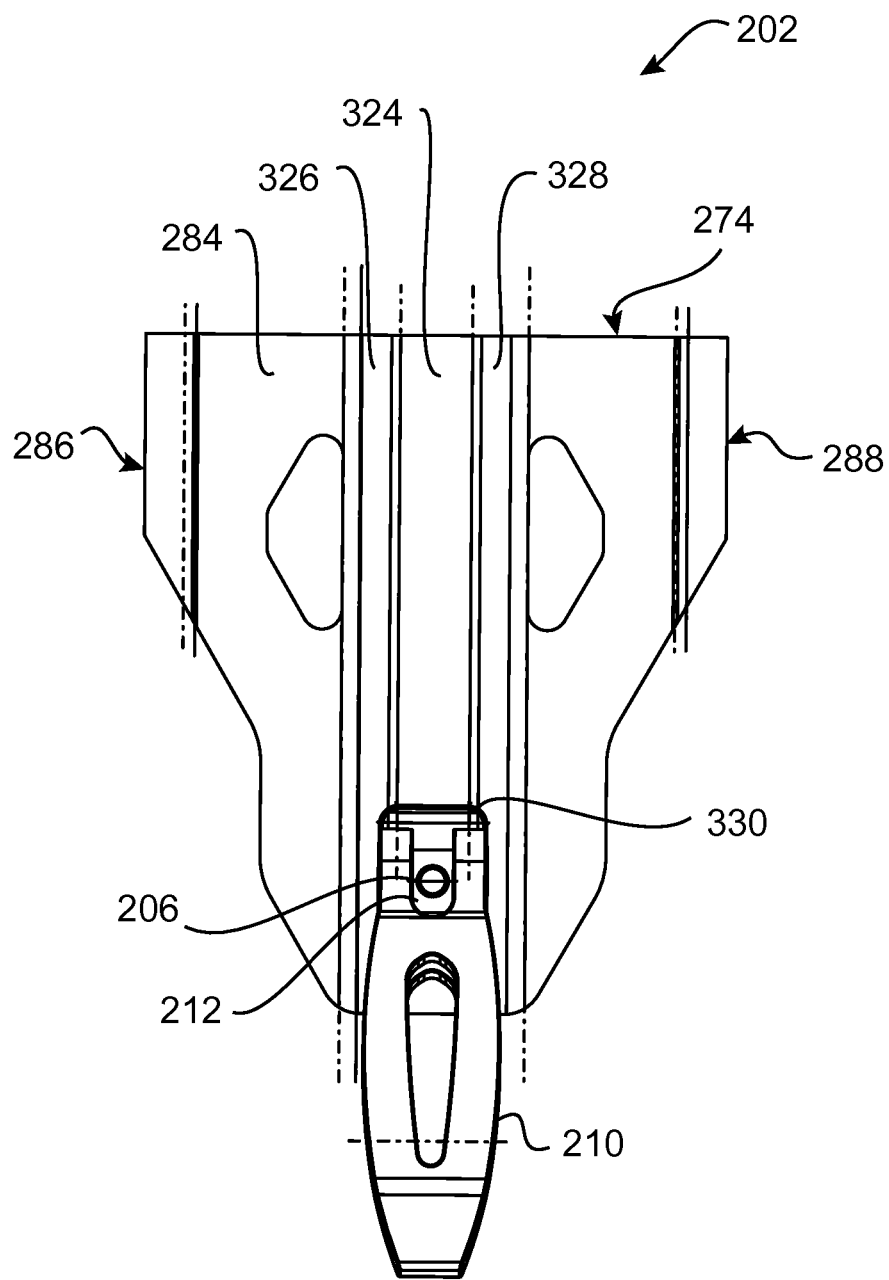
FIG. 5C is a back elevation view of the outer member of FIG. 5A.
Figure 5D:
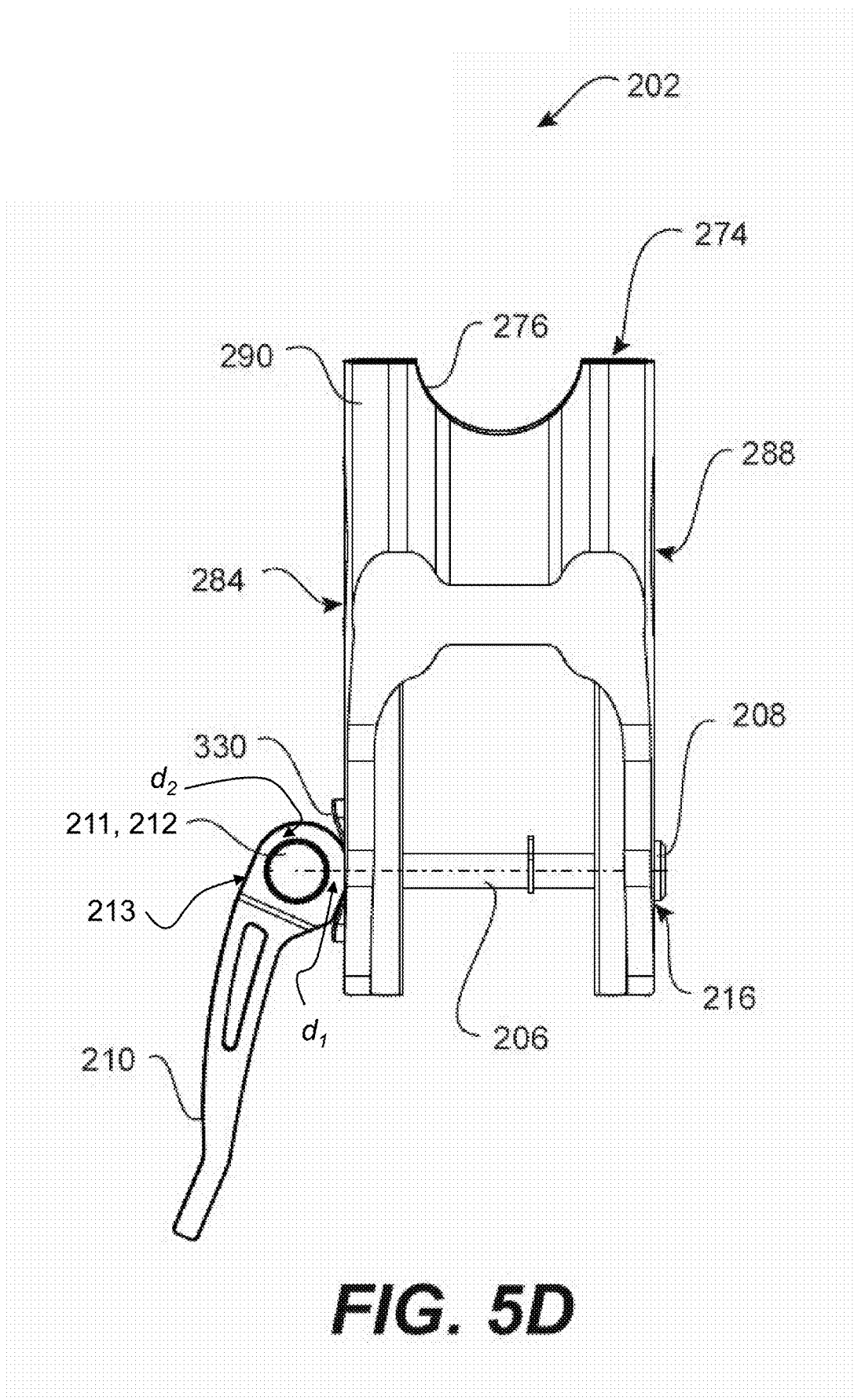
FIG. 5D is a right side elevation view of the outer member of FIG. 5A.
Figure 5E:
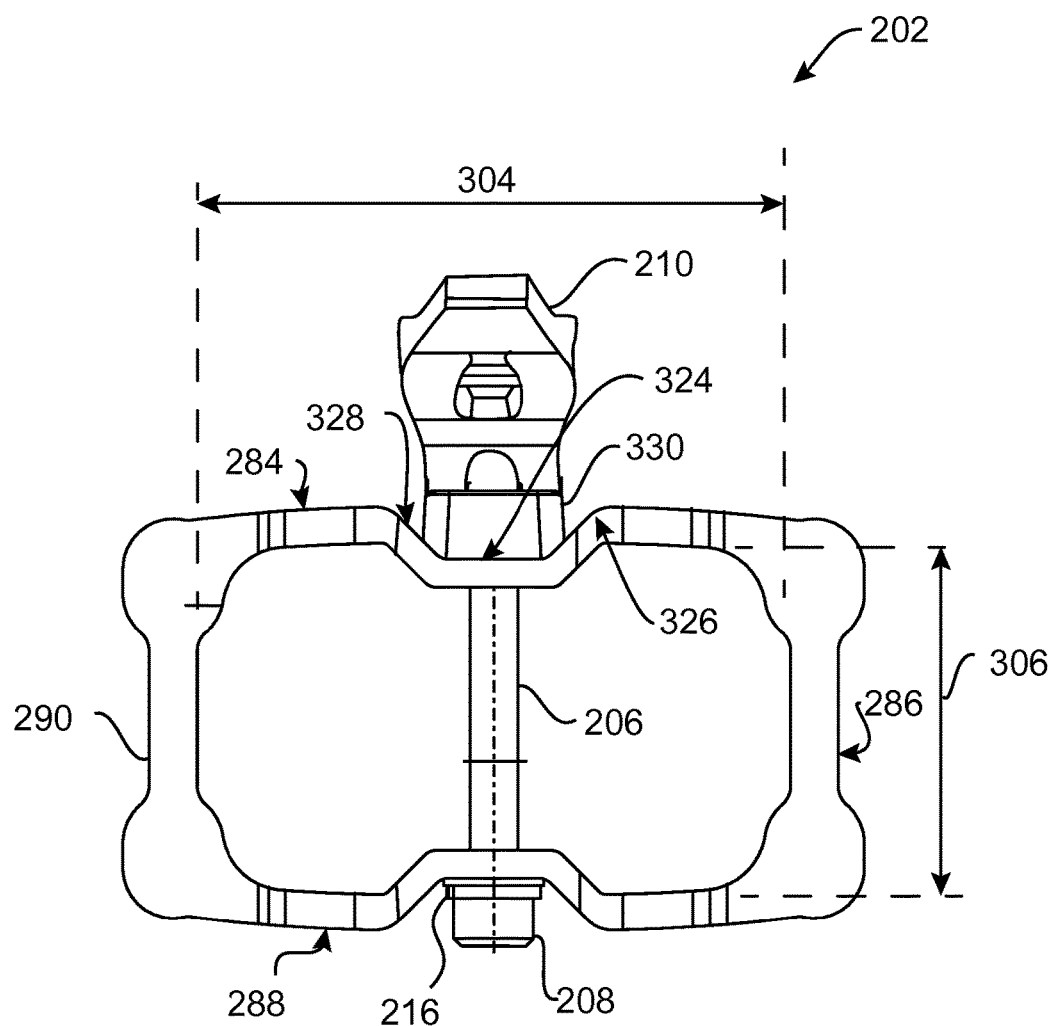
FIG. 5E is a bottom plan view of the outer member of FIG. 5A.

The cam lever 210 releaseably exerts a tension on the pin 206. The cam lever 210 may be placed in an unlocked position, releasing any tension on the pin 206 and releasing any pressure on the spacer 330. The cam lever 210 may also be placed in a locked position. The cam lever 210 is rotatable to alternate between the unlocked and the locked positions. Referring particularly to FIG. 5D, the cylindrical nut 212 is received in an aperture 211 of the cam lever 210 that is eccentrically positioned within a portion 213 of the cam lever 210. A thickness $d_1$ of a periphery of the portion 213 of the cam lever 210 that mates with the spacer 330 when the cam lever 210 is in the locked position, as shown on FIG. 5D, is greater than a thickness $d_2$ of the periphery of the portion 213 that mates with the spacer 330 when the cam lever 210 is in the unlocked position, as shown for example on FIG. 6B. In the locked position, the greater thickness $d_1$ of the periphery of the portion 213 causes the cylindrical nut 212 to move away from the spacer 330. As a result, the cam lever 210 and the head 208, exert a tension on the pin 206 for pressing on the spacer 330 and further on the outer member 202, deflecting the outer member 202 onto the inner member 204 for locking the outer member 202 at a selected position relative to the inner member 204. Initial tension adjustment is made by rotating the pin 206 while the cam lever 201 is in the unlocked position, the smaller thickness $d_2$ of the periphery of the portion 213 being positioned again the spacer 330 so that the threaded end 214 of the pin 206 is driven into the cylindrical nut 212 until a snug fit of the cam lever 210 on the spacer 330 and on the outer member 202 is obtained. Final tensioning is then made by pivoting the cam lever 210 until its length is generally parallel to a length of the outer member 202, placing the greater thickness $d_1$ of the periphery of the portion 213 on the spacer 330 and pulling the cylindrical nut 212 away from the spacer 330, preventing any relative movement between the inner and outer members 204 and 202 during use. Examples of materials considered appropriate for the cam lever 210 include, but are not limited to, acetal polymers and nylon.

The spacer 330 is rigid so as not to deform under the action of the cam lever 201. The spacer 330 provides a generally U-shaped, low-friction face 334 over which the cam lever 210 can easily rotate while compressing the spacer 330 between the cam lever 210 and the outer member 202. As shown in the cross-sectional view of FIG. 7C, the spacer 330 includes a flat-bottomed V-shaped front face that is congruous with and mates with the back side 284 of the outer member 202. The U-shaped rear face 334 and the flat-bottomed V-shaped front face of spacer 330 prevent the cam lever 210 from inadvertently rotating about pin 206 even when in the unlocked position. The flat-bottomed V-shaped front face of the spacer 330 comprises a middle face 336 and two angled faces 338 and 339 on both sides of the middle face 336. The circular aperture 332 is defined in the middle face 336 of the spacer 330. When the cam lever 210 is rotated to the locked position, the middle face 336 and the angled faces 338 and 339 of the spacer 330 exert a force onto the middle external faces 324 and on the angled external faces 326 and 328 of the outer member 202. This force ensures that the angled faces 296 and 298 of the outer member 202 are directly pushed toward the angled faces 262 and 264 of the inner member 204, as best seen on FIG. 7C. Because of the angled faces 338 and 339 of the spacer 330, the angled faces 296 and 298 of the outer member 202 are forced directly into the angled faces 262 and 264 of the inner member 204, creating a contact area where the force generated by the pin 206 and the cam lever 210 is directly applied and thus the force required to keep the outer member 202 into contact with the inner member 204 is not only the deformation of the outer member 202. Again with respect to FIG. 7C, forces F1 and F3 exerted by the spacer 330 onto the outer member 202 are parallel to forces F2 and F4 exerted by the outer member 202 onto the inner member 204.

The head 208 applies a force F5, via the lock washer 216, on the front side 288 of the outer member 202. The force F5 results in forces F6 and F7 transmitted between the angled faces 300 and 302 of the outer member 202 and the angled faces 266 and 268 of the inner member 204, at contact areas aa and bb. A vector sum of F6 and F7 opposes a vector sum of F2 and F4.

A length of contact A1 defined between by the angled faces 338 and 339 of the spacer 330 and portions of the angled external faces 326 and 328 of the outer member 202 in contact with angled faces 338 and 339 is inferior to the lengths of contact areas cc and dd defined between the angled faces 296, 298 of the outer member 202 and the angled faces 262, 264 of the inner member 204.

Because of the angled orientation of the faces 326, 328, 338 and 339, the forces F2, F4, F6 and F7 each have force components Fd in a direction parallel to an axis of the pin 206 and force components Fw in a direction perpendicular to Fd. Both Fd and Fw prevent relative vertical movements between the outer member 202 and the inner member 204 to maintain a level of insertion of the inner member 204 into the outer member 202. Additionally, the Fw components of the forces F2 and F6 are in one direction while Fw components the forces F4 and F7 are in an opposite direction. Upon application by the handlebar of a clockwise or counter clockwise moment M on the pin 206, cancellation of the Fw components of the forces F2 and F6 by the forces F4 and F7 prevents relative rotation about the axis of the pin 206, or play, between the inner member 204 and the outer member 202. Thus the contact areas aa, bb, cc and dd formed when the cam lever 210 is in the locked position prevent both vertical movements and rotational movements between the inner member 204 and the outer member 202.

A variant of the adjustable handlebar riser 200 may locate the cam lever 210 and the cylindrical nut 212, or another locking member, on a left or right side of the outer member 202, the pin 206 being inserted through apertures located on the left and right sides 286, 290 of the outer member 202 and through apertures located on the left and right sides 232, 236 of the inner member 204. It is also contemplated to provide individual holes in place of slots 222 to render the adjustments finite instead of infinite.

Turning to FIGS. 7 to 10, operation of the adjustable handlebar riser assembly 200 will now be described.

Figure 7A:
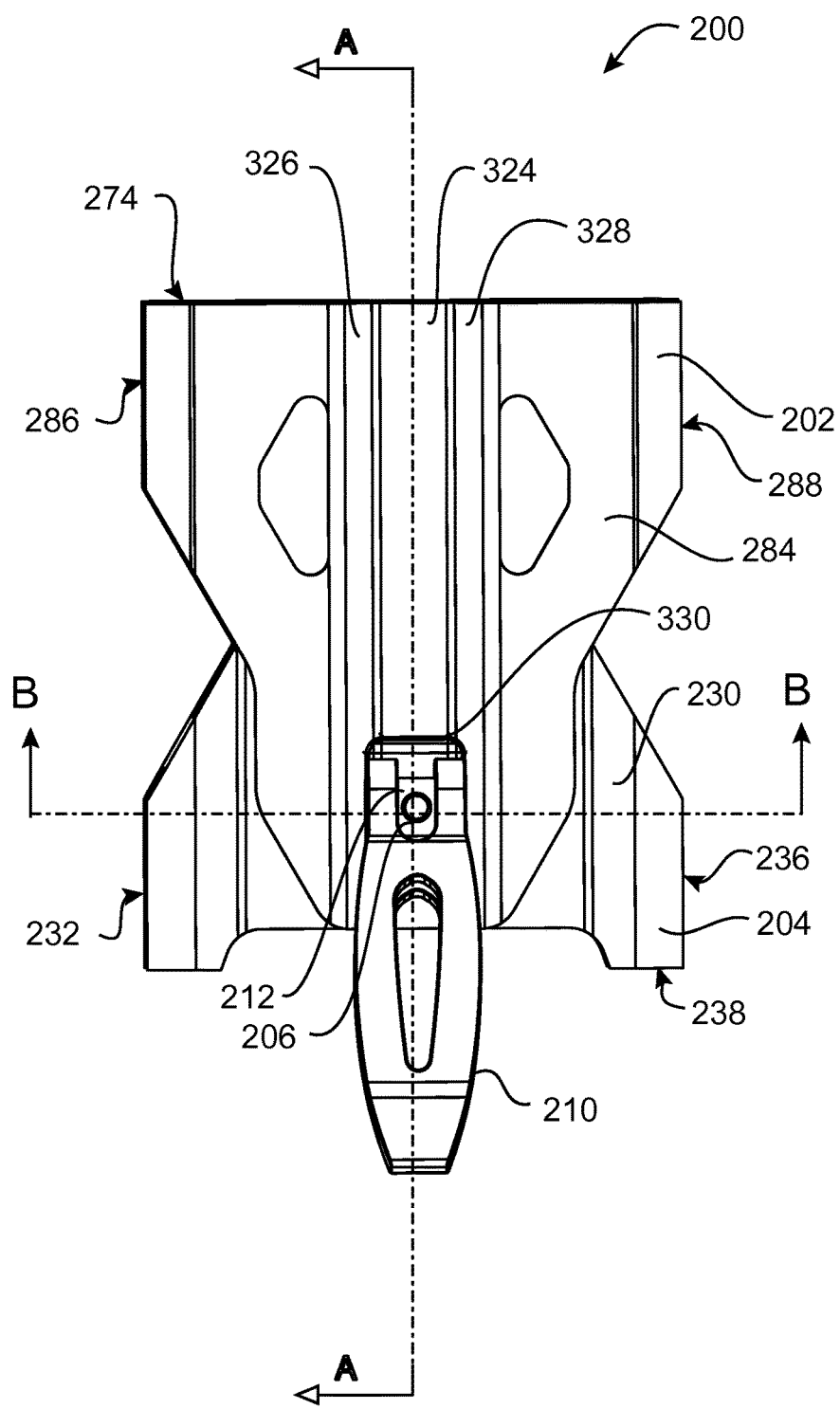
FIG. 7A is a back elevation view of the adjustable handlebar riser assembly of FIG. 3.
Figure 7B:
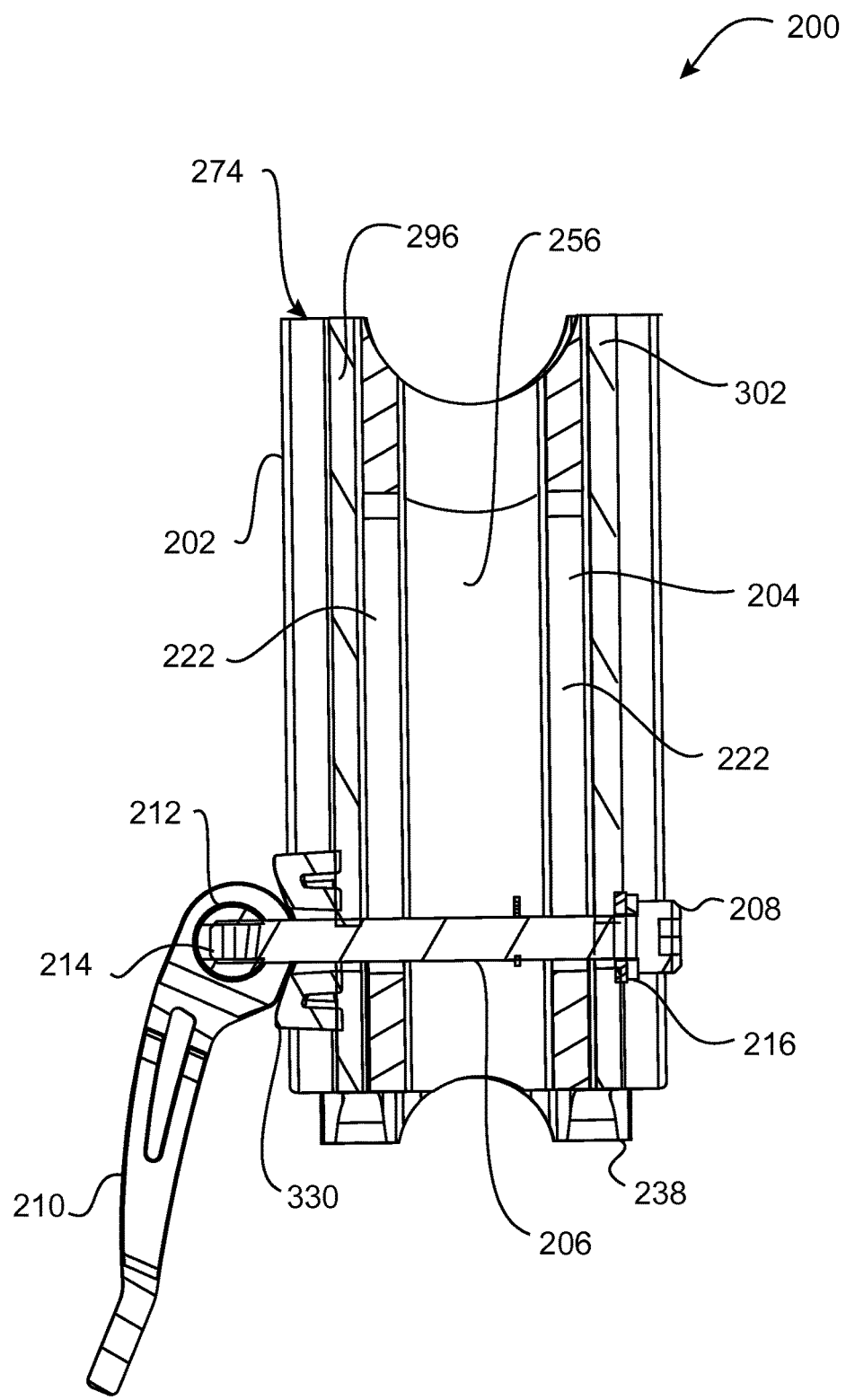
FIG. 7B is a cross-sectional view of the adjustable handlebar riser assembly of FIG. 3 taken through line A-A of the back elevation view of FIG. 7A.
Figure 7C:
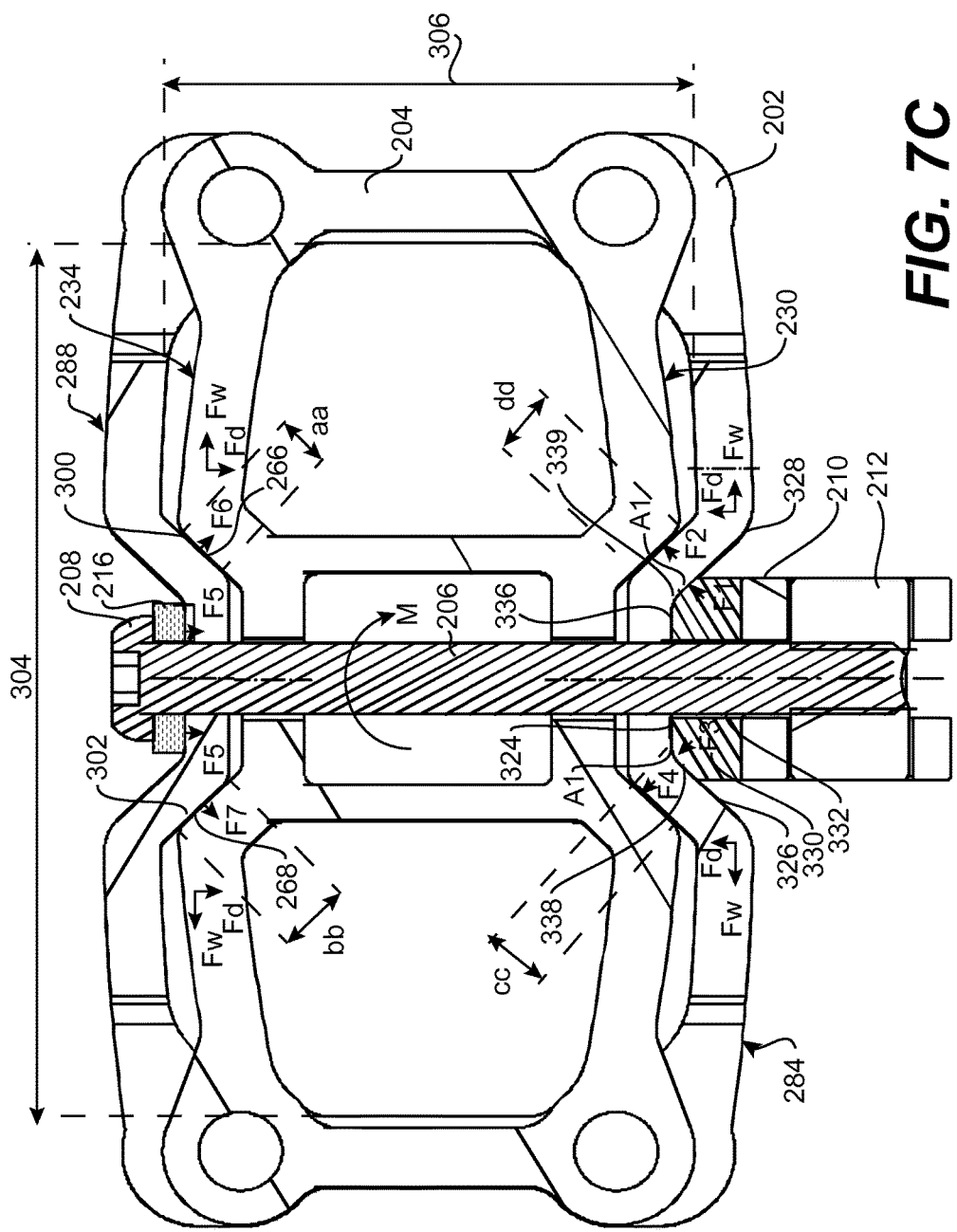
FIG. 7C is a cross-sectional view of the adjustable handlebar riser assembly of FIG. 3 taken through line B-B of the back elevation view of FIG. 7A.
Figure 8A:
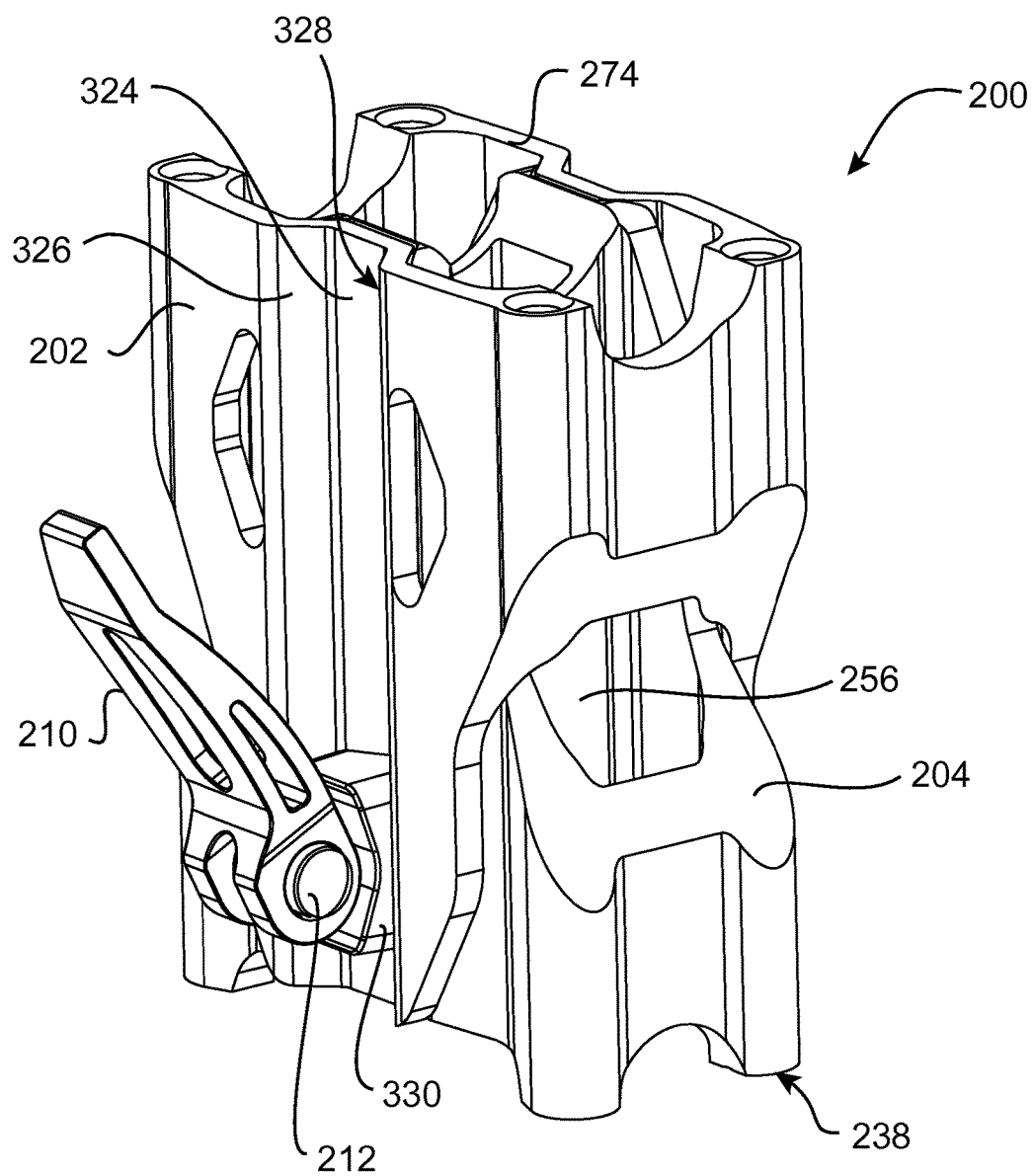
FIGS. 8A and 8B are perspective views, taken from the back, right side, of the adjustable handlebar riser assembly of FIG. 3, in a lowered position and in a raised position, respectively, with the locking member in the unlocked position.
Figure 8B:
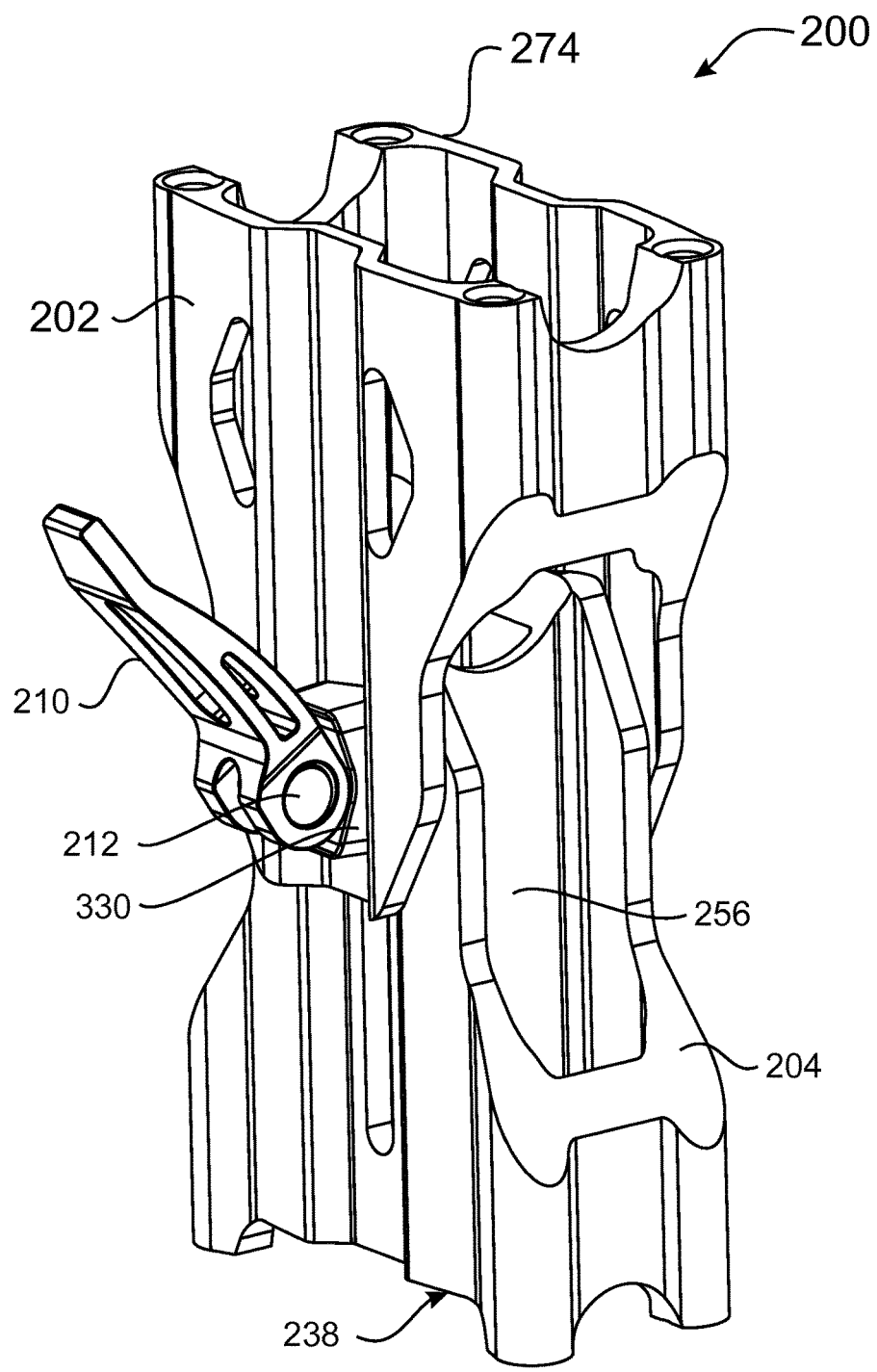
Figure 9A:
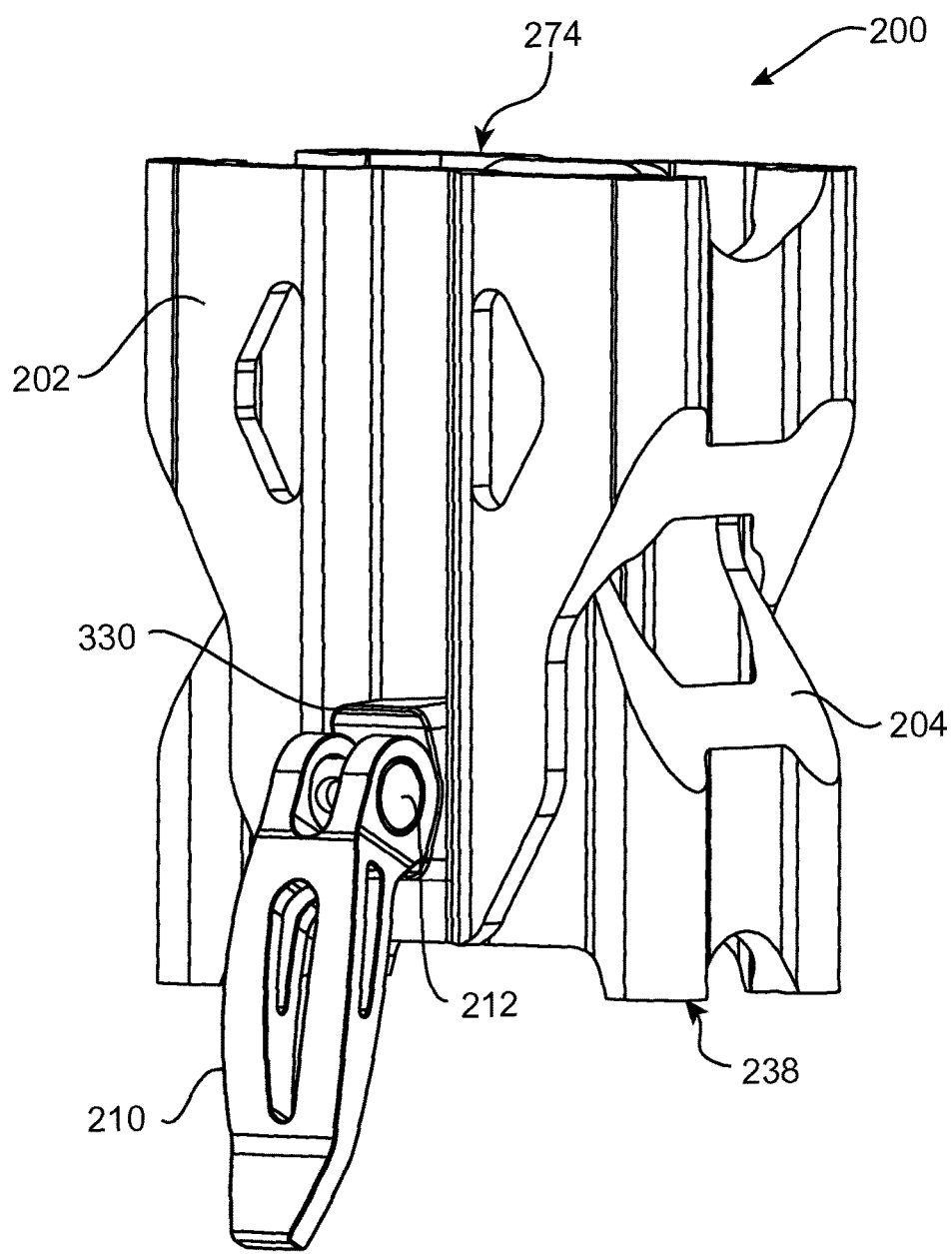
FIGS. 9A and 9B are perspective views, taken from the back, right side, of the adjustable handlebar riser assembly of FIG. 3, in a lowered position and in a raised position, respectively, with the locking member in the locked position.
Figure 9B:
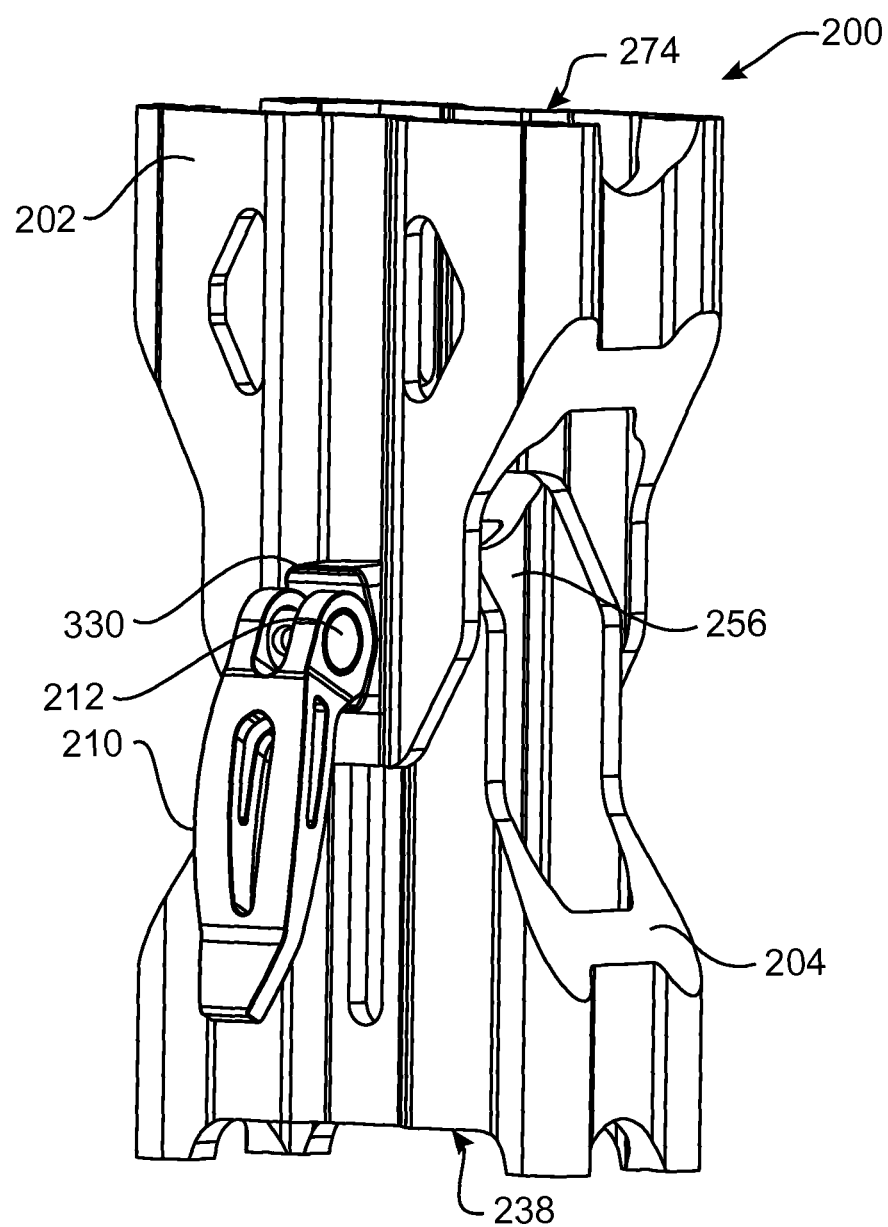

The cross-sectional view of FIG. 7B, taken about cutaway lines A-A visible on FIG. 7A, illustrates how the cam lever 210 pulls on the cylindrical nut 212 to exert a tension on the pin 206 while applying pressure on the back side 284 of the outer member 202, via the spacer 330. The head 208, at the other end of the pin 206, applies pressure on the front side 288 of the outer member 202, via the lock nut 216. The back and front sides 284 and 288 of the outer member 202 deflect under the applied pressure and transmit the pressure to the back and front sides 230 and 234 of the inner member 204. More particularly, the pressure is applied between various faces of the flat-bottomed V-shaped protrusions and recesses of the back sides 284 and 230, and of the front sides 288 and 234, as described above. The reinforcement walls 254 and 256 prevent deformation of the inner member 204.

A variant of the inner member 204, constructed without the reinforcement walls 254 and 256 and possibly with a sturdier construction of the sides 230, 232, 234 and 236 of the inner member 204, is also contemplated.

Figure 10A:
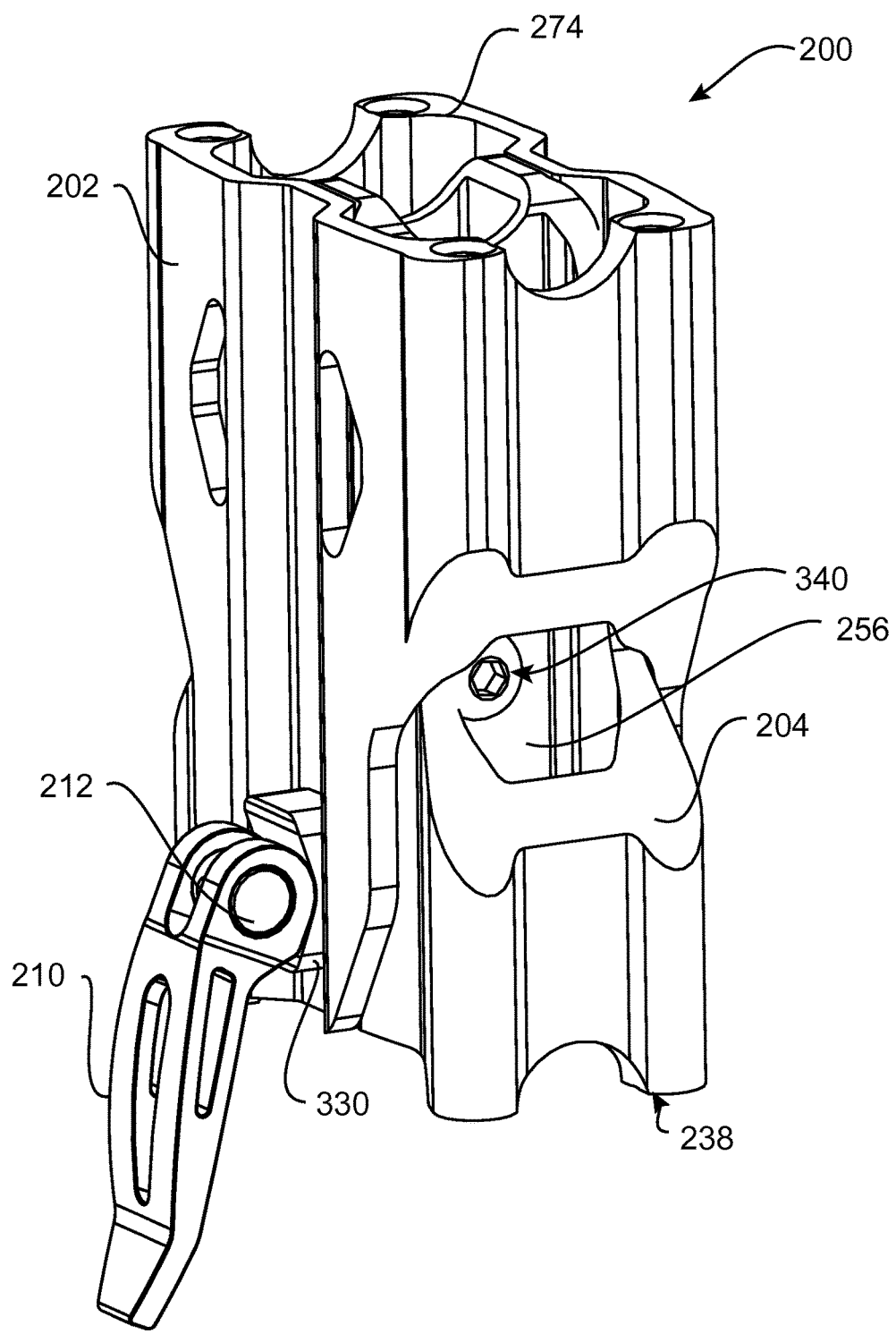
FIGS. 10A and 10B are perspective views, taken from the back, right side, of a variant of the adjustable handlebar riser assembly of FIG. 3, in a lowered position and in a raised position, respectively.
Figure 10B:
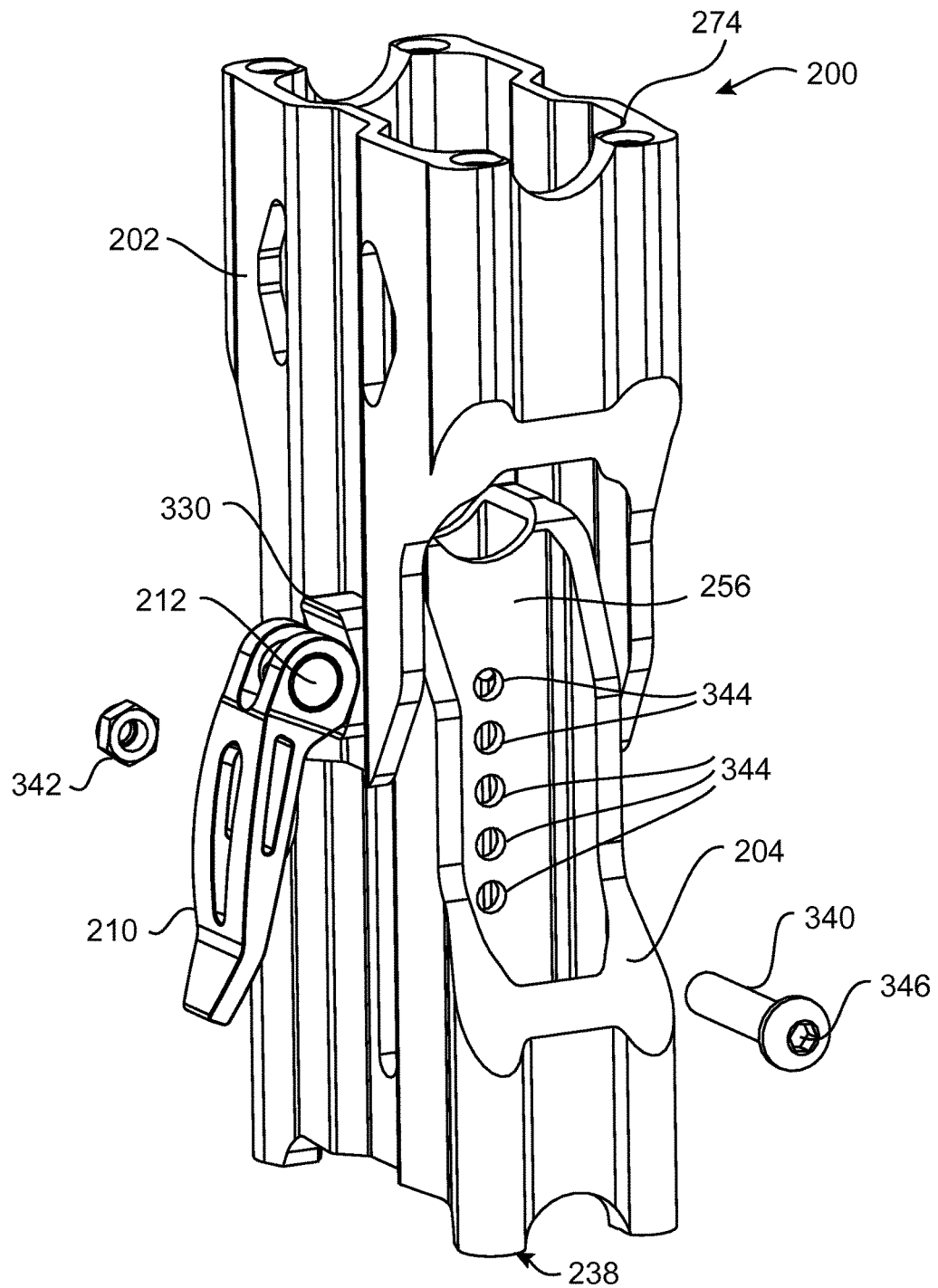

Another variant of the inner member 204 is illustrated on FIGS. 10A and 10B. In this variant, the reinforcement wall 256 has a plurality of apertures 344. It is contemplated that the reinforcement wall 256 could have a single aperture 344. Though not shown, the reinforcement wall 254 also has one or more apertures matching the apertures 344 for allowing insertion of a cross bolt 340 transversally through both reinforcement walls 254 and 256. The cross bolt 340 has, at one end, a head 346 comprising a recess for insertion of a hex key (not shown) and attaches at an opposite end to a nut 342. Other types of fasteners or quick release pins are also contemplated.

The cross bolt 340 can be inserted above or below the pin 206 to selectively limit an adjustment range of the adjustable handlebar riser assembly 200. Inserting the cross bolt 340 below the pin 206 limits the insertion of the inner member 204 into the outer member 202. Insertion of the cross bolt 340 above the pin 206 limits an overall extension of the adjustable handlebar riser assembly 200. Two cross bolts 340 inserted into two apertures 344, positioned above and below the pint 206 and attached with two nuts 342, can limit further the adjustment range of the adjustable handlebar riser assembly 200.

Figure 11A:
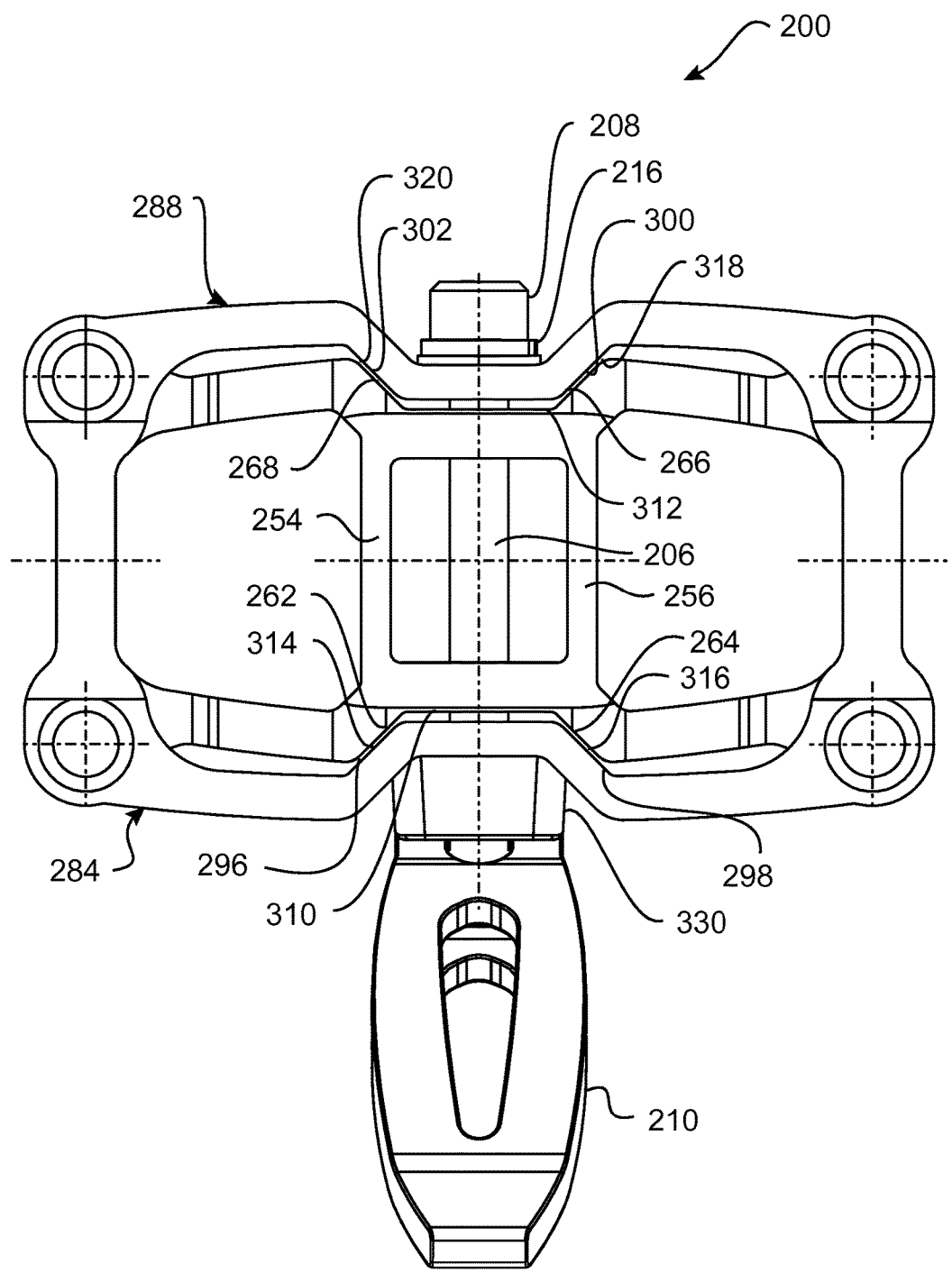
FIGS. 11A and 11B are top plan views of the adjustable handlebar riser assembly of FIG. 3, with the locking member in the unlocked position and in the locked position, respectively.
Figure 11B:
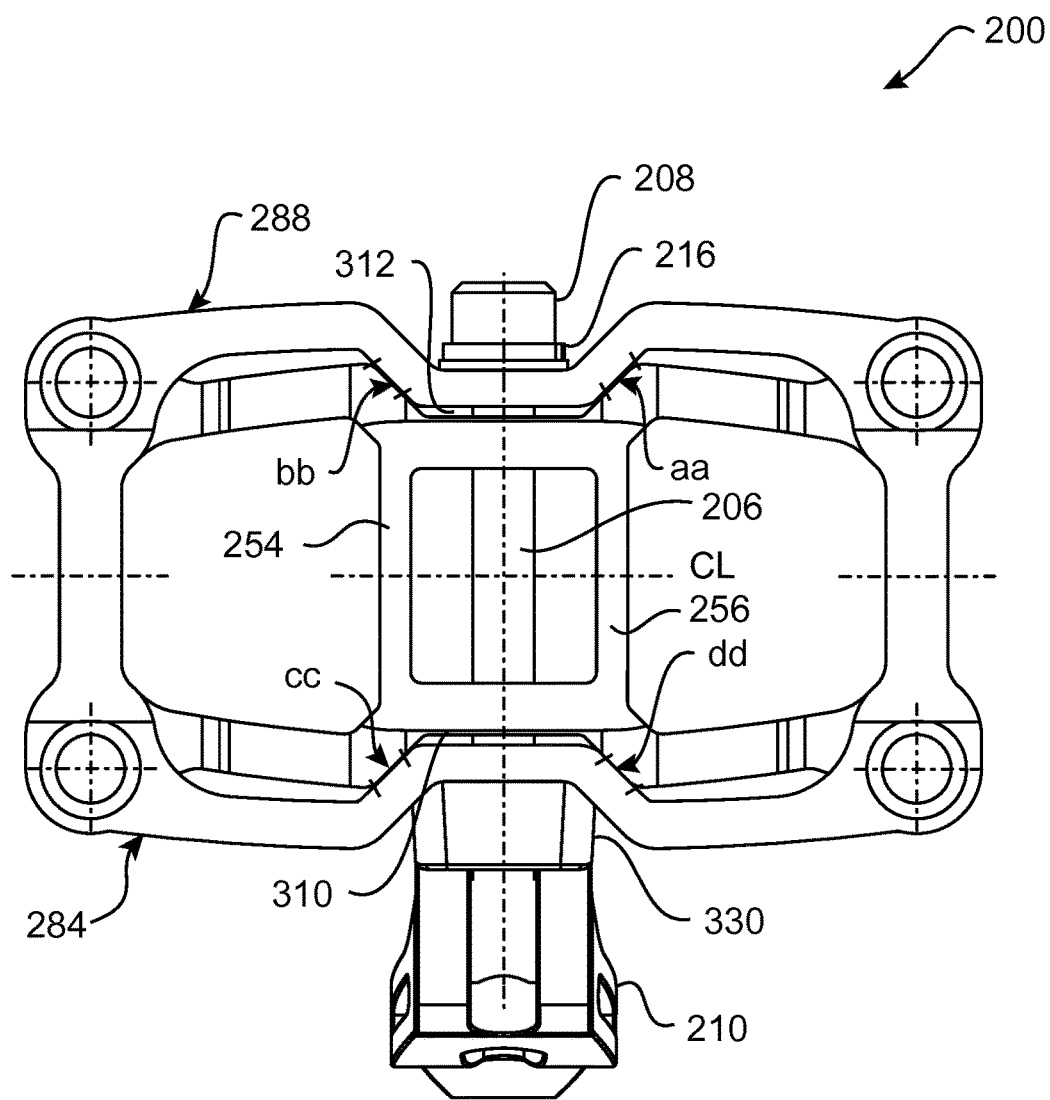

As can be seen on FIG. 11A, in the unlocked position, small gaps 310, 312, 314, 316, 318 and 320 are present between the various faces of the flat-bottomed V-shaped recesses of the inner member 204 and of the flat-bottomed V-shaped protrusions of the outer member 202. As such, the outer member 202 and the handlebar 18 that is attached thereto can easily be raised or lowered relative to the inner member 204 and to the horizontal shaft 44. As can be seen on FIG. 11B, in the locked position, at least gaps 314, 316, 318 and 320 have been closed by a slight deformation of the back and front sides 284 and 288 of the outer member. Hence strong contact is made between angled faces 262, 264, 266 and 268 of the inner member 204 and corresponding angled faces 296, 298, 300 and 302 of the outer member 202. Though reduced, the gaps 310 and 312 are preserved between the middle faces 258 and 260 of the inner member 204 and corresponding middle faces 292 and 294 of the outer member 202. Reinforcement walls 254 and 256 join with front and back sides 234 and 230 of the inner member 204 at lateral positions corresponding at least in part to contact areas cc, dd, aa and bb between angled faces 262, 264, 266 and 268 of the inner member 204 and corresponding angled faces 296, 298, 300 and 302 of the outer member 202 to ensure little if no deflection of the sides 234 and 230. The contact areas aa and bb are on an opposite side of a lateral centerline CL from the contact areas cc and dd. The contact areas aa and bb are placed on one side of the pin 206 axis, while the contact cc and dd are on an opposite side of the pin 206 axis along a direction of the lateral centerline CL. Forces applied to the contact areas bb and cc are mostly transferred to the reinforcement wall 254 while the forces applied to the contact areas aa and dd are mostly transferred to the reinforcement wall 256.

Figure 12:
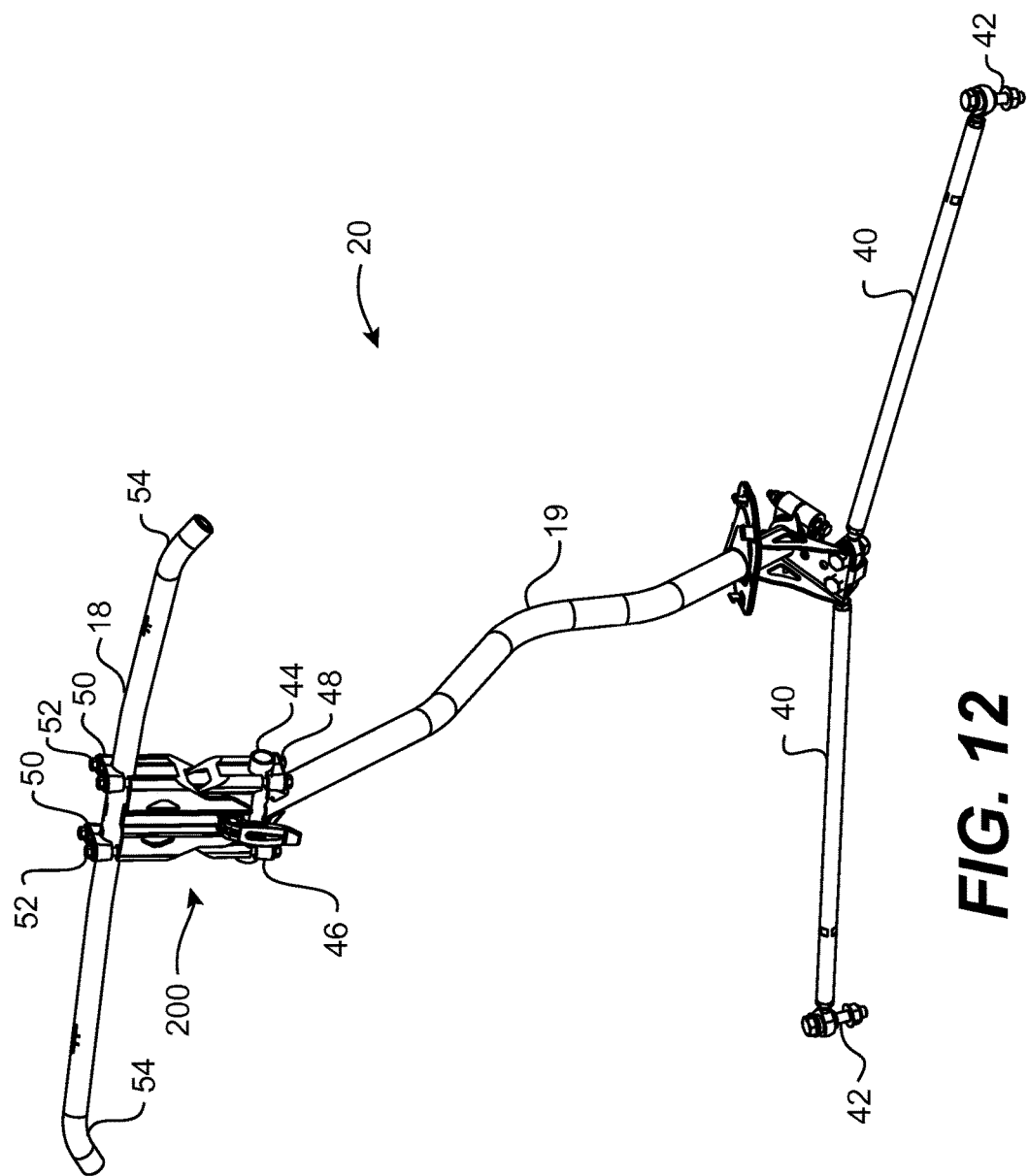
FIG. 12 is a perspective view, taken from a rear, right side, of a steering column having the adjustable handlebar riser assembly of FIG. 3.
Figure 13:
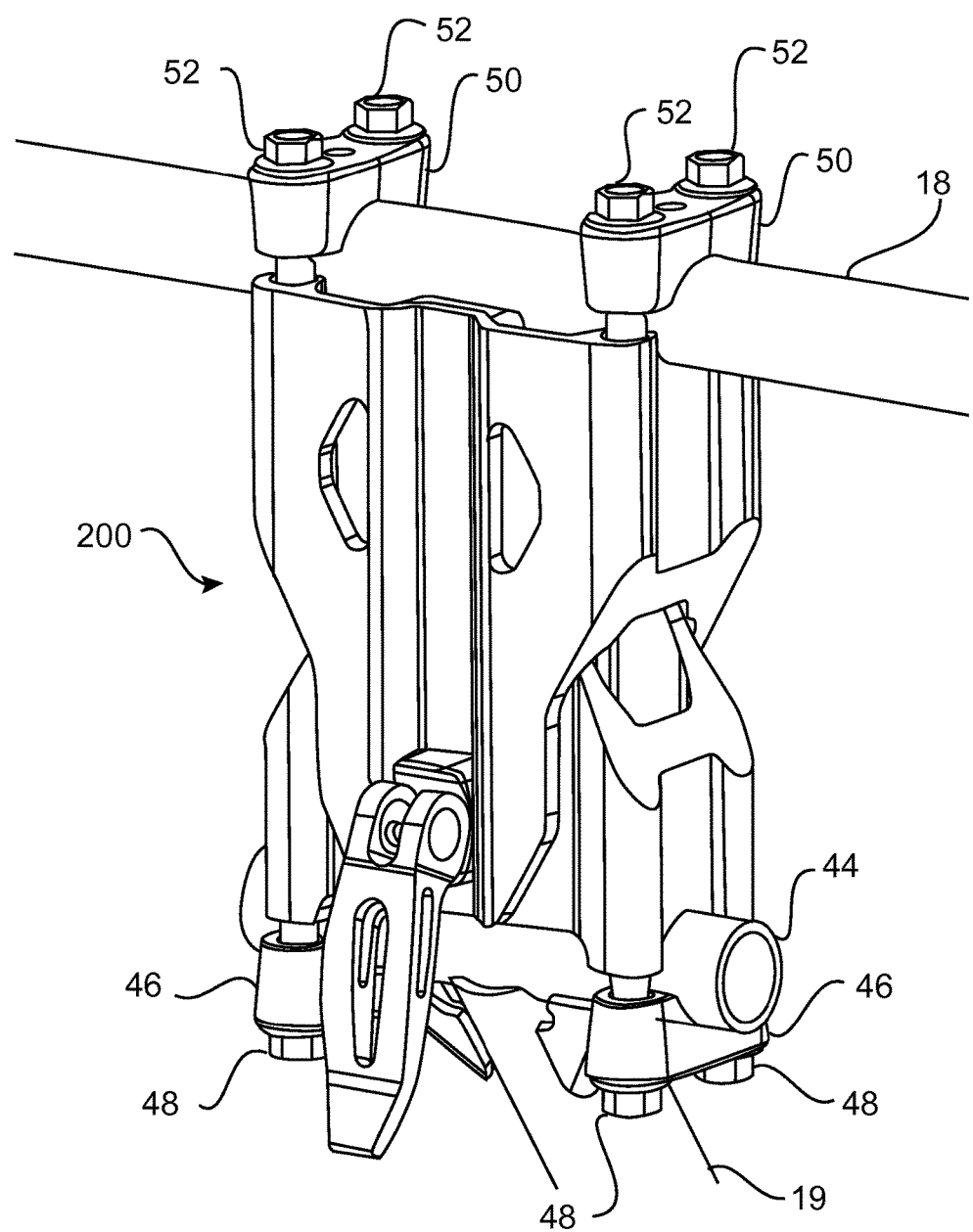
FIG. 13 is a close-up view of an upper portion of the assembly of FIG. 12.

As can be seen on FIGS. 12 and 13, the adjustable handlebar riser assembly 200 is mounted to the horizontal shaft 44 of the steering column 20. The horizontal shaft 44 is fixedly attached to the steering column shaft assembly 19. Attachment of the handlebar riser assembly 200 to the horizontal shaft 44 is made using end caps 46 and bolts 48 or like fasteners screwed into the holes 241, 242, 244 and 246 of the inner member 204. The handlebar 18 is mounted on the adjustable handlebar riser assembly 200 using end caps 50 and bolts 52 or like fasteners screwed into the holes 277, 278, 280 and 283 of the outer member 202. The adjustable handlebar riser assembly 200 is mountable vertically or at a variable pivot angle relative to the steering column shaft assembly 19. The handlebar 18 may be rotated so that handles 54 may adopt an angle preferred by a user of a vehicle using the disclosed arrangement.

Fixed risers of the prior art, such as the riser 100 of FIG. 1, can be replaced by the adjustable handlebar riser assembly 200 of the present invention. The riser 100 is usually mounted to the steering column 20 using clamps or caps as well as bolts or similar fasteners. Using ordinary tools to, the handlebar 18 can be detached from the riser 100, which can then be detached from the horizontal shaft 44. The handlebar riser assembly 200 can now be installed on the horizontal shaft 44 using similar tools to fasten the caps 46 and the bolts 48. A pivot angle of the handlebar riser assembly 200 relative to the steering column shaft assembly 19 can be selected before final tightening of the bolts 48. Finally, the handlebar 18 is installed on the handlebar riser assembly 200, using the caps 50 and the bolts 52. An angle of the handlebar 18 is adjusted before final tightening of the bolts 52.

In the embodiment shown on FIGS. 3 to 13, the outer member 202 is a top member and the inner member 204 is a bottom member. A variant in which the outer member 202 is a bottom member and the inner member 204 is a top member is also contemplated. Likewise, the embodiment of FIGS. 3 to 13 shows a single circular aperture 220 on each opposite face of the outer member 202 and a single slot 222 on each opposite face of the inner member 204. A variant having slots on each opposite face of the outer member 202 and of the inner member 204, and another variant having a plurality of apertures on each opposite face of the outer member 202 and/or having one or more apertures on each opposite face of the inner member 204, are also contemplated.

It is contemplated that the head 208 could be replaced with other types of retaining members operably connected to the pin 206 and capable of maintaining an end of the pin 206 outside of the outer member 202. Other such retaining members include for example a cotter pin, a nut, a c-clip, a T-handle and the like. Likewise, the cam lever 210 and the cylindrical nut 212 may be replaced with other types of locking members operably connected to the pin 206 and capable of applying a tension on the pin 206. An example of a locking member comprises a rotatable handle having threads matching the threads 214 of the pin 206.

In the present embodiment, the outer member 202 and the inner member 204 are constructed of extruded aluminum. Other embodiments in which the outer member 202 and the inner member 204 are constructed from other materials including, without limitation, steel, other metals, various plastics, composite materials, and the like, are also contemplated.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

What is claimed is:

1. An adjustable handlebar riser assembly comprising:
   an outer member having opposite sides, a flat-bottomed V-shaped protrusion being formed on an internal face of each of the opposite sides of the outer member;
   an inner member slidably disposed at least in part within the outer member, the inner member having opposite sides, a flat-bottomed V-shaped recess adapted for mating with a corresponding flat-bottomed V-shaped protrusion of the outer member being formed on an external face of each of the opposite sides of the inner member;
   each of the outer and inner members having at least one aperture;
   a pin having an axis normal to the opposite sides of the outer member, the pin being inserted in one of the at least one aperture of the outer member and in one of the at least one aperture of the inner member;
   a retaining member connected to the pin; and
   a locking member operatively connected to the pin at an opposed end from the retaining member,
   the locking member being movable between an unlocked position and a locked position;
   wherein, when in the locked position, the locking member exerts a tension on the pin, the locking member and the retaining member pressing the outer member onto the inner member for locking the outer member at one of a plurality of selectable positions relative to the inner member; and
   wherein, when the locking member is in the unlocked position, one of the inner and outer members can move in relation to an other one of the inner and outer members while the other one of the inner and outer members is in a fixed position.

2. The adjustable handlebar riser assembly of claim 1, wherein:
   the outer member has four contiguous sides defining a hollow interior allowing at least partial insertion of the inner member therein; and
   the inner member has four contiguous sides and further comprises a pair of reinforcement walls extending between the opposite sides of the inner member for resisting the tension exerted on the pin.

3. The adjustable handlebar riser assembly of claim 2, wherein the internal reinforcement walls extend on either sides of the pin.

4. The adjustable handlebar riser assembly of claim 1, wherein:
   the at least one aperture of one of the outer and inner members is diametrically opposed apertures for insertion of the pin;

the at least one aperture of an other of the outer and inner members is diametrically opposed slots for slideable insertion of the pin; and the tension exerted on the pin causes a deformation of the outer member for pressing the outer member onto the inner member.

5. The adjustable handlebar riser assembly of claim 4, wherein the deformation of the outer member causes closure of a gap between angled faces of the flat-bottomed V-shaped protrusions of the outer member and angled faces of the flat-bottomed V-shaped recesses of the inner member.

6. The adjustable handlebar riser assembly of claim 1, wherein the locking member comprises a cam lever adapted to release the tension on the pin when in an unlocked position and to exert the tension on the pin when in a locked position.

7. The adjustable handlebar riser assembly of claim 6, wherein the cam lever is rotatable between the unlocked position and the locked position.

8. The adjustable handlebar riser assembly of claim 7, further comprising a cylindrical nut held by the cam lever and fastened to the pin;
wherein moving the cam lever in the locked position pulls on the cylindrical nut to exert the tension on the pin.

9. The adjustable handlebar riser assembly of claim 1, wherein pressing the outer member onto the inner member comprises pressing an internal face of the outer member onto an external face of the inner member.

10. The adjustable handlebar riser assembly of claim 1, wherein the at least one aperture of one of the inner and outer members comprises an elongated slot extending along one of the opposite sides of the one of the inner and outer members.

11. The adjustable handlebar riser assembly of claim 1, wherein:
one of the inner and outer members has a first mating end for receiving a handlebar at a first end of the adjustable handlebar riser; and
an other one of the inner and outer members has a second mating end for mounting to a steering column shaft at a second end of the adjustable handlebar riser opposite from the first end.

12. The adjustable handlebar riser assembly of claim 11, wherein:
the first mating end comprises an upper surface having recesses adapted for receiving the handlebar and having holes for receiving fasteners for attaching the handlebar to the outer member; and
the second mating end comprises a lower surface having recesses adapted for mounting on the steering column shaft and having holes for receiving fasteners for attaching the inner member to the steering column shaft.

13. The adjustable handlebar riser assembly of claim 11, wherein the first and second mating ends each comprise a surface having recesses sized and shaped for interchangeably receiving the handlebar and mounting to the steering column shaft.

14. The adjustable handlebar riser assembly of claim 11, wherein:
the first mating end and the second mating end have substantially equal widths; and
an insertable depth of the inner member is smaller than an interior depth of the outer member.

15. The adjustable handlebar riser assembly of claim 1, further comprising a spacer disposed between the locking member and an external face of the outer member, the spacer having an aperture, the pin being inserted in the aperture of the spacer, the locking member pressing on the spacer for further pressing the outer member onto the inner member.

16. The adjustable handlebar riser assembly of claim 15, wherein the spacer has angled faces contacting angled external faces of the outer member.

17. The adjustable handlebar riser assembly of claim 16, wherein contact between the angled faces of the spacer and the angled external faces of the outer member prevents relative rotation between the inner member and the outer member about the axis of the pin.

18. The adjustable handlebar riser assembly of claim 16, wherein pressing of the locking member on the spacer generates first forces transmitted between the angled faces of the spacer and the angled external faces of the outer member and further generates second forces parallel to the first forces, the second forces being transmitted between angled faces of the flat-bottomed V-shaped protrusions of the outer member and angled faces of the flat-bottomed V-shaped recesses of the inner member.

19. The adjustable handlebar riser assembly of claim 18, wherein the second forces maintain a level of insertion of the inner member into the outer member and prevent relative rotation between the inner member and the outer member about the axis of the pin.

20. The adjustable handlebar riser assembly of claim 16, wherein a first contact area between the angled faces of the spacer and the angled external faces of the outer member is less than a second contact area between the flat-bottomed V-shaped recesses of the inner member and the flat-bottomed V-shaped protrusions of the outer member.

* * * * *